United States Patent
Lin et al.

(10) Patent No.: US 7,791,994 B2
(45) Date of Patent: Sep. 7, 2010

(54) APPARATUS AND METHOD FOR DEMODULATING INPUT SIGNAL MODULATED FROM REFERENCE SIGNAL AND DATA SIGNAL

(75) Inventors: Yu-Hsuan Lin, Tai-Chung (TW); Shu-Hung Chou, Taipei County (TW); Pi-Hai Liu, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 344 days.

(21) Appl. No.: 12/129,666

(22) Filed: May 29, 2008

(65) Prior Publication Data

US 2009/0296545 A1  Dec. 3, 2009

(51) Int. Cl.
*G11B 7/00* (2006.01)
(52) U.S. Cl. .................................. 369/47.19; 369/53.34
(58) Field of Classification Search ........................ None
See application file for complete search history.

(56) References Cited

U.S. PATENT DOCUMENTS

| | | | | |
|---|---|---|---|---|
| 4,519,058 A | * | 5/1985 | Tsurushima et al. | 369/53.16 |
| 4,907,092 A | * | 3/1990 | Iwase et al. | 386/95 |
| 5,054,017 A | * | 10/1991 | Hiroyoshi et al. | 369/275.1 |
| 5,708,640 A | * | 1/1998 | Fukuda et al. | 369/47.17 |
| 5,917,863 A | * | 6/1999 | Soichi et al. | 375/341 |
| 6,345,018 B1 | * | 2/2002 | Maegawa et al. | 369/44.13 |
| 7,099,244 B2 | * | 8/2006 | Nakata et al. | 369/47.19 |
| 7,173,890 B2 | * | 2/2007 | Arai | 369/47.22 |
| 2003/0048721 A1 | * | 3/2003 | Maeda et al. | 369/53.34 |

* cited by examiner

*Primary Examiner*—Peter Vincent Agustin
(74) *Attorney, Agent, or Firm*—Winston Hsu

(57) ABSTRACT

An apparatus and method for demodulating an input signal modulated from a reference signal and a data signal are disclosed. The apparatus includes a determining unit, a first calculating unit, and a comparing unit. The determining unit is utilized for determining a plurality of first calculating timings of changing different calculating modes according to the input signal. The first calculating unit is coupled to the determining unit and utilized for generating a first calculating result of the input signal according to the first calculating timings and the calculating modes thereof. The comparing unit is coupled to the first calculating unit and utilized for generating a comparing result according to the first calculating result of the input signal and a threshold setting, and for outputting a demodulated data of the input signal according to the comparing result.

30 Claims, 20 Drawing Sheets

| ADIP unit number | ADIP unit type | ADIP nibble bit number | ADIP codeword nibble number |
| --- | --- | --- | --- |
| 0 | monotone | --- | --- |
| 1 | Sync_0 | --- | |
| 2 | monotone | --- | |
| 3 | Sync_1 | --- | |
| 4 | monotone | --- | |
| 5 | Sync_2 | --- | |
| 6 | monotone | --- | |
| 7 | Sync_3 | --- | |
| 8 | Reference | --- | |
| 9 | Data_x | b3 | C0 |
| 10 | Data_x | b2 | |
| 11 | Data_x | b1 | |
| 12 | Data_x | b0 | |
| 13 | Reference | --- | --- |
| 14 | Data_x | b3 | C1 |
| 15 | Data_x | b2 | |
| 16 | Data_x | b1 | |
| 17 | Data_x | b0 | |
| 18 | Reference | --- | --- |
| ⋮ | ⋮ | ⋮ | ⋮ |
| 78 | Reference | --- | --- |
| 79 | Data_x | b3 | C14 |
| 80 | Data_x | b2 | |
| 81 | Data_x | b1 | |
| 82 | Data_x | b0 | |

APPARATUS AND METHOD FOR DEMODULATING INPUT SIGNAL MODULATED FROM REFERENCE SIGNAL AND DATA SIGNAL

BACKGROUND

The present invention relates to an apparatus and method for demodulating an input signal modulated from a reference signal and a data signal, and more particularly, to an apparatus and method for efficiently demodulating a saw tooth wobble (STW) signal modulated from a wobble signal and a data signal in a BD (Blu-ray Disk).

In general, the STW signal in the BD is formed by a sinusoidal signal having a wobble frequency (i.e. the wobble signal) added to another sinusoidal signal having a data frequency (i.e. the data signal), wherein the data frequency is twice as greater as the wobble frequency. Please refer to FIG. 1 in conjunction with FIG. 2. FIG. 1 is a simplified diagram showing an STW signal modulated from the wobble signal and a data 1 signal having a first data frequency (i.e. an STW data 1 signal), and FIG. 2 is a simplified diagram showing another STW signal modulated from the wobble signal and a data 0 signal having a second data frequency (i.e. an STW data 0 signal).

Based on the signal characteristics depicted in FIG. 1 and FIG. 2, including phase and frequency, conventional apparatus and methods usually utilize a band-pass filter whose center frequency is at the data frequency (i.e. the double wobble frequency), or multiply the input signal with the data frequency and then extract the data signal. However, the band-pass filter and the multiplier are very expensive, and therefore it is quite difficult to reduce the cost of the conventional apparatus and methods for demodulating the STW signal in the BD.

SUMMARY OF THE INVENTION

It is therefore one of the objectives of the present invention to provide an apparatus and method for efficiently demodulating an STW signal comprising a wobble signal and a data signal, to solve the above problem.

According to an embodiment of the present invention, an apparatus for demodulating an input signal modulated from a reference signal and a data signal is disclosed. The apparatus comprises a determining unit, a first calculating unit, and a comparing unit. The determining unit is arranged to determine a plurality of first calculating timings of changing different calculating modes according to the input signal. The first calculating unit is arranged to generate a first calculating result of the input signal according to the first calculating timings and the calculating modes thereof. The comparing unit is arranged to generate a comparing result according to the first calculating result of the input signal and a threshold setting, and output a demodulated data of the input signal according to the comparing result.

According to an embodiment of the present invention, a method for demodulating an input signal modulated from a reference signal and a data signal is further disclosed. The method comprises: determining a plurality of first calculating timings of changing different calculating modes according to the input signal; generating a first calculating result of the input signal according to the first calculating timings and the calculating modes thereof; generating a comparing result according to the first calculating result of the input signal and a threshold setting; and outputting a demodulated data of the input signal according to the comparing result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 16 shows an arrangement of an address in pre-groove (ADIP) word according to BD specifications.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
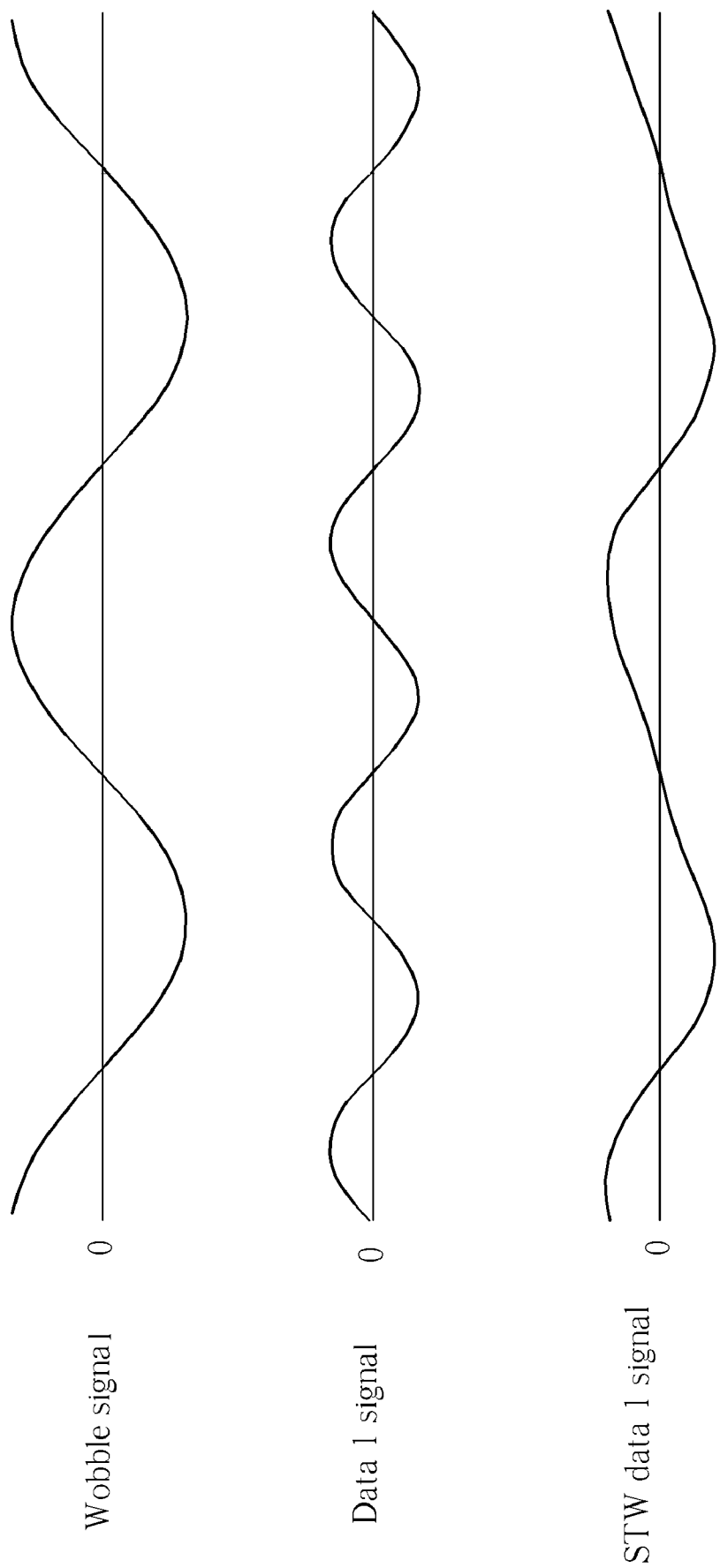
FIG. 1 shows an STW signal modulated from a wobble signal and a data 1 signal having a first data frequency.
Figure 2:
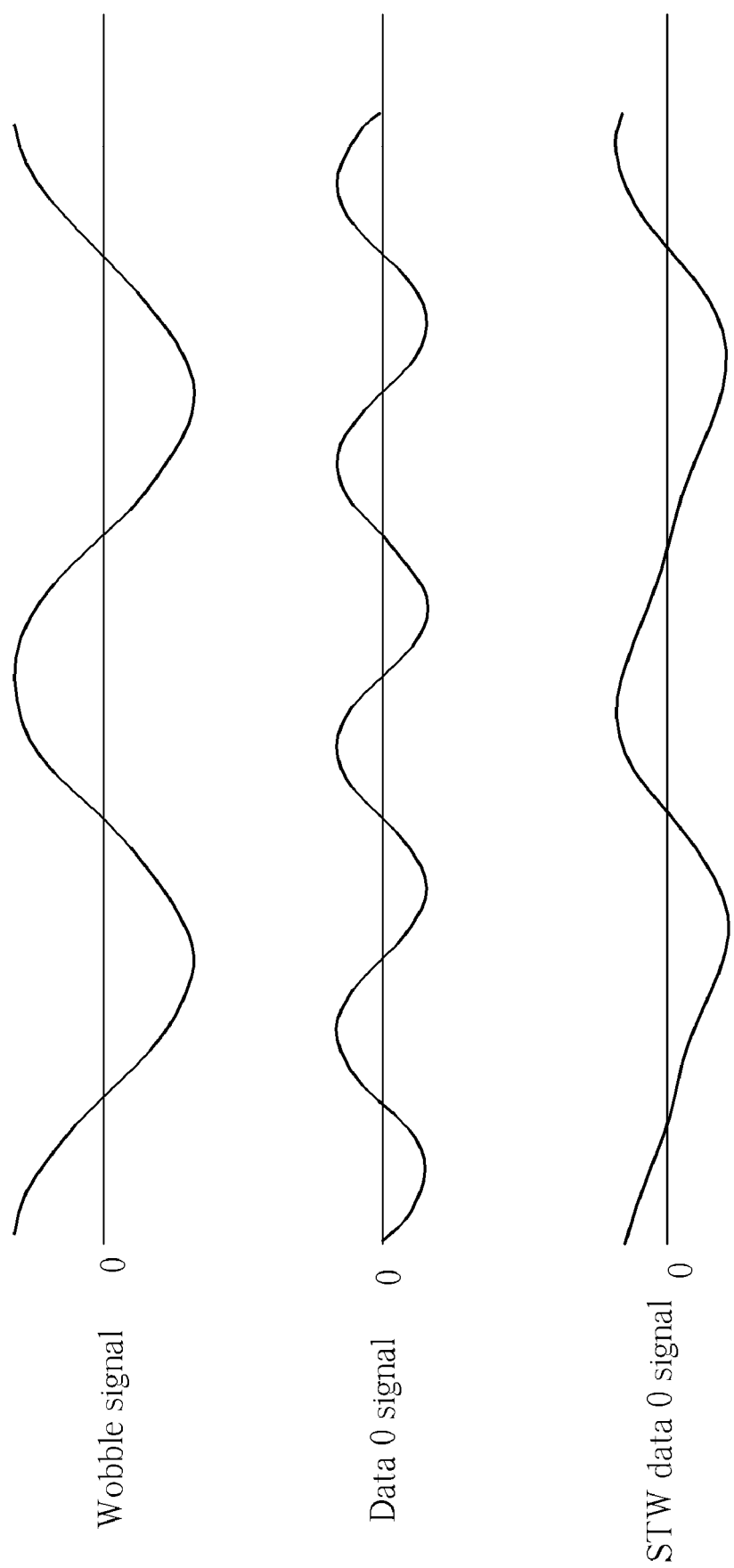
FIG. 2 shows an STW signal modulated from a wobble signal and a data 0 signal having a second data frequency.
Figure 3:
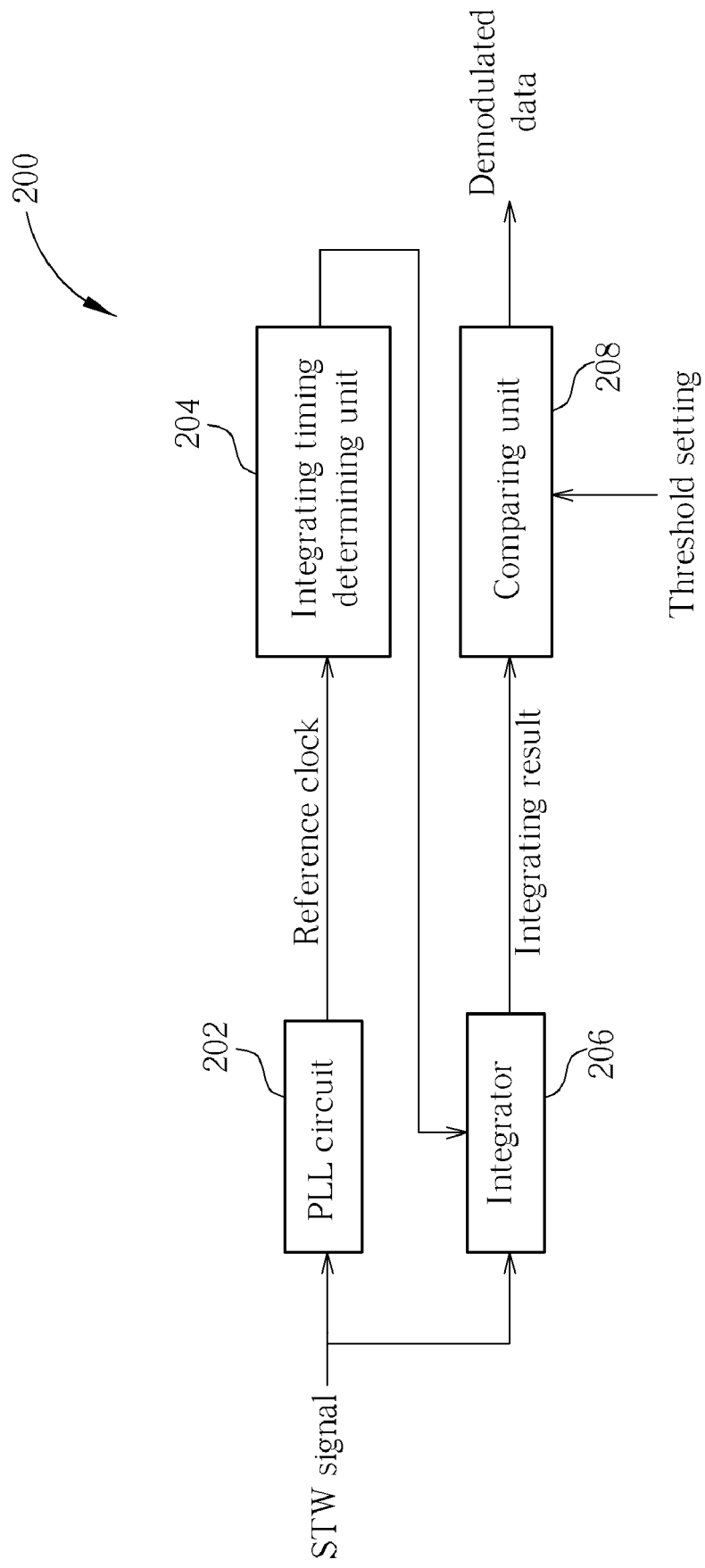
FIG. 3 shows an apparatus for demodulating an STW signal modulated from a wobble signal and a data signal in a BD according to a first embodiment of the present invention.
Figure 4:
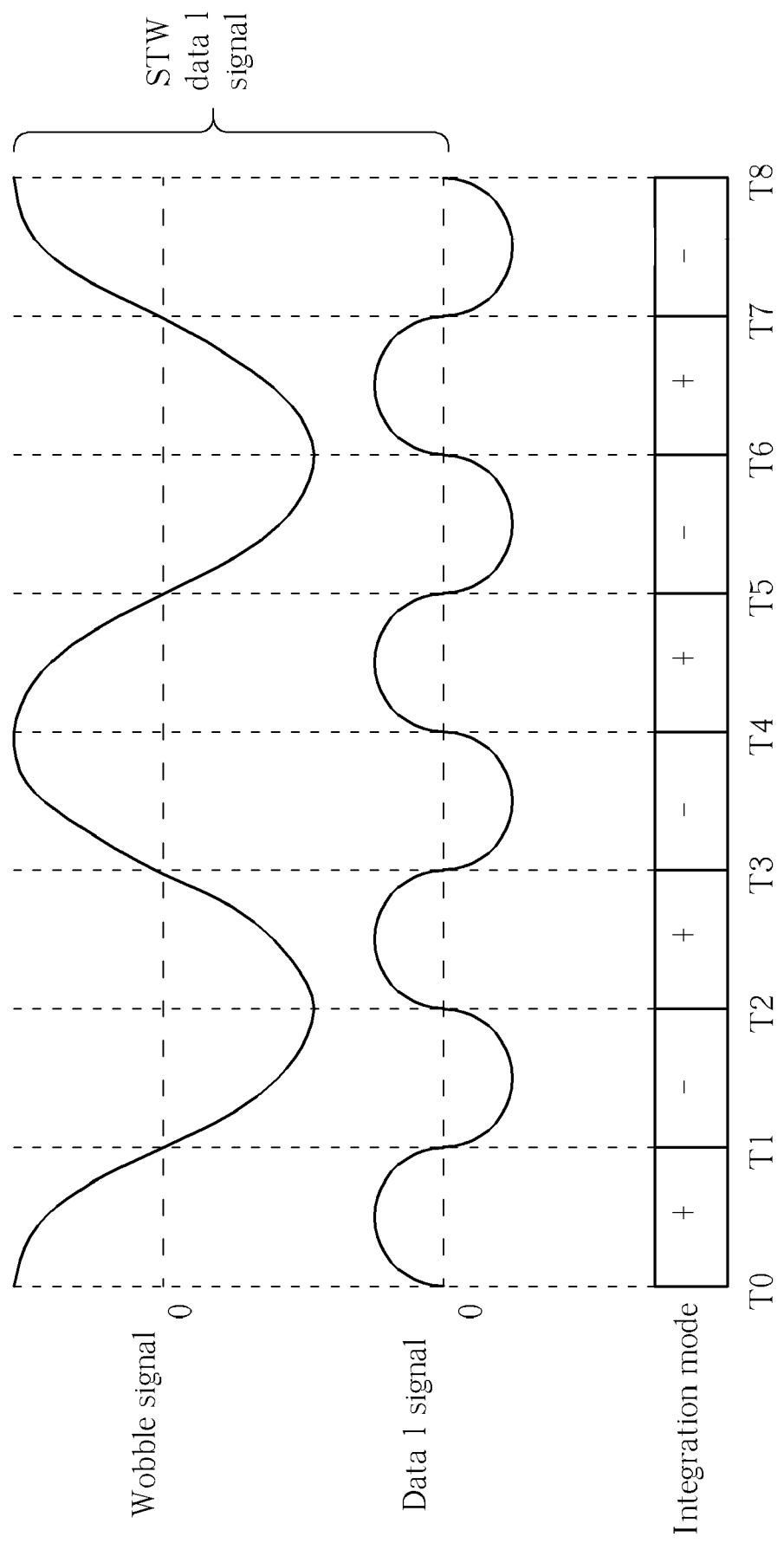
FIG. 4 shows how the present invention method demodulates an STW signal modulated from a wobble signal and a data 1 signal by performing an integrating operation according to the first embodiment in FIG. 3.
Figure 5:
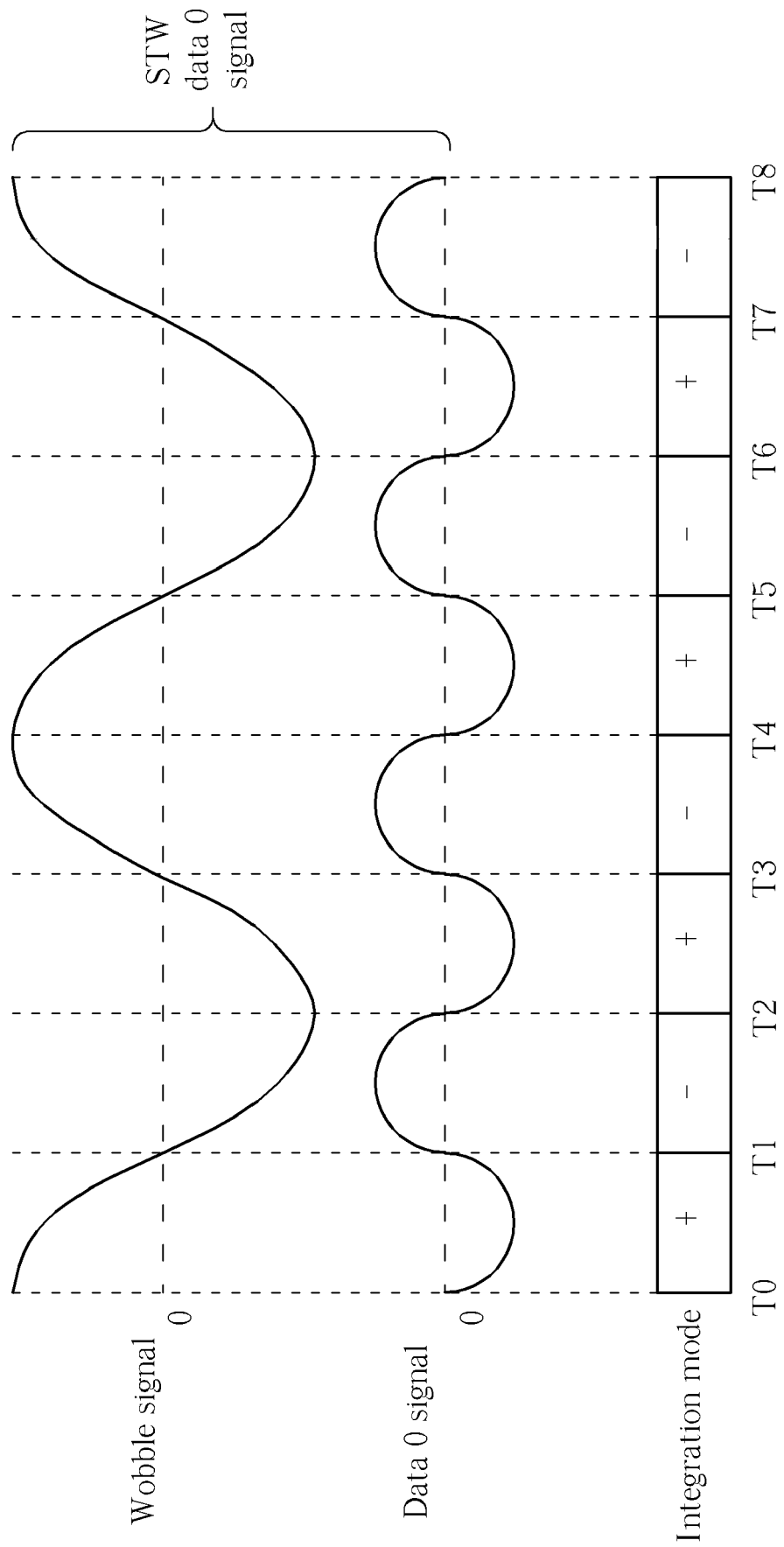
FIG. 5 shows how the present invention method demodulates an STW signal modulated from the wobble signal and a data 0 signal by performing an integrating operation according to the first embodiment in FIG. 3.

Please refer to FIG. 3, FIG. 4, and FIG. 5 together. FIG. 3 shows a simplified block diagram of a demodulating apparatus 200 for demodulating a saw tooth wobble (STW) signal modulated from a wobble signal and a data signal in a BD (Blu-ray Disk) (not shown) according to a first embodiment of the present invention. FIG. 4 is a simplified diagram showing how the present invention method demodulates an STW signal modulated from the wobble signal and a data 1 signal (i.e. an STW data 1 signal) by performing an integrating operation according to the first embodiment shown in FIG. 3.

FIG. 5 is a simplified diagram showing how the present invention method demodulates another STW signal modulated from the wobble signal and a data 0 signal (i.e. an STW data 0 signal) by performing an integrating operation according to the first embodiment shown in FIG. 3. There is a phase difference of 180 degrees between the data 1 signal and the data 0 signal.

As shown in FIG. 3, the exemplary demodulating apparatus 200 includes a phase locked loop (PLL) circuit 202, an integrating timing determining unit 204, an integrator 206, and a comparing unit 208. The PLL circuit 202 is coupled to the integrating timing determining unit 204 and utilized for performing a clock recovering operation according to the STW signal and then generating a reference clock locked to the wobble signal. The integrating timing determining unit 204 is utilized for determining a plurality of integrating timing points of changing different integrating modes according to the reference clock. The integrator 206 is coupled to the integrating timing determining unit 204 and utilized for generating an integrating result of the STW signal according to the applied integrating timing points and the integrating modes thereof. The comparing unit 208 is coupled to the integrator 206 and utilized for generating a comparing result according to at least the integrating result of the STW signal and a threshold setting, and then outputting demodulated data of the STW signal, either "1" or "0", according to the comparing result. A further illustration will be described in detail in the following paragraphs with reference to FIG. 4 and FIG. 5.

As shown by the waveforms of FIG. 4 and FIG. 5, the wobble signal has a wobble frequency, the data 1 signal has a first data frequency and the data 0 signal has a second data frequency, wherein both the first data frequency and the second data frequency are twice as great as the wobble frequency, and there is a phase difference of 180 degrees between the data 1 signal and the data 0 signal. The zero crossing points of the data 1 signal and the data 0 signal are the same as those of the wobble signal, and thus the STW signal will has the same zero crossing point as that of the wobble signal.

The present invention method is able to slice the wobble signal and recover the phase of the wobble signal by utilizing the PLL circuit 202, and then generate the integrating timings of changing the positive and negative integrating modes from the recovered phase of the wobble signal by utilizing the integrating timing determining unit 204. In other words, the present invention method can utilize the PLL circuit 202 to perform the clock recovery operation according to the STW signal for generating the reference clock locked to the wobble signal, and then utilize the integrating timing determining unit 204 to determine the integrating timing points of changing the positive and negative integrating modes according to the reference clock. The operational details and configuration details related to utilizing the PLL circuit 202 for performing the clock recovering operation according to the STW signal and generating the reference clock locked to the wobble signal are all well known to those of average skill in this art, and thus further explanation of the details and operations are omitted herein for the sake of brevity.

As shown in FIG. 4 and FIG. 5, the integrating timing points of changing the positive and negative integrating modes determined by the integrating timing determining unit 204 are respectively T0, T1, T2, T3, T4, T5, T6, T7, and T8. The positive integrating modes are set during respective time intervals between T0 and T1, T2 and T3, T4 and T5, and T6 and T7, and the negative integrating modes are set during respective time intervals between T1 and T2, T3 and T4, T5 and T6, and T7 and T8. Therefore, when the integrator 206 performs the integrating operation on the STW signal according to the integrating timing points (T0, T1, T2, T3, T4, T5, T6, T7, and T8) and the positive and negative integrating modes thereof, the integrating result of the wobble signal during the time interval between T0 and T2 will be eliminated by the integrating result of the wobble signal during the time interval between T2 and T4; in the same way, the integrating result of the wobble signal during the time interval between T4 and T6 will be eliminated by the integrating result of the wobble signal during the time interval between T6 and T8.

However, the integrating result of the data 1 signal will become a very large positive value during the time interval between T0 and T8, and the integrating result of the data 0 signal will become a very large negative value during the time interval between T0 and T8. Therefore, the integrating result of the STW data 1 signal generated by the integrator 206 according to the integrating timing points (T0, T1, T2, T3, T4, T5, T6, T7, and T8) and the positive and negative integrating modes during the time interval between T0 and T8 will be equal to the integrating result of the data 1 signal during the time interval between T0 and T8; and the integrating result of the STW data 0 signal generated by the integrator 206 according to the integrating timing points (T0, T1, T2, T3, T4, T5, T6, T7, and T8) and the positive and negative integrating modes during the time interval between T0 and T8 will be equal to the integrating result of the data 0 signal during the time interval between T0 and T8. In other words, the integrating result of the STW data 1 signal generated by the integrator 206 is a very large positive value, and the integrating result of the STW data 0 signal generated by the integrator 206 is a very large negative value.

For example, the present invention method can utilize a value of zero as a threshold setting for the comparing unit 208, and then the comparing unit 208 can be utilized for generating a comparing result according to the integrating result of the STW signal and the threshold setting (i.e. zero), for outputting a demodulated data of the STW signal according to the comparing result. In other words, if the comparing result shows that the integrating result of the STW signal is much larger than zero then the comparing unit 208 will output data 1, and if the comparing result shows that the integrating result of the STW signal is much smaller than zero then the comparing unit 208 will output data 0.

In addition, please note that it is not necessary for the integrator 206 to perform the integrating operation throughout the time interval from T0 to T8 in order to generate the integrating result of the STW signal. For example, the integrator 206 can merely perform the integrating operation during the time interval between T0 and T4 in order to generate the integrating result of the STW signal; this is only for illustration purposes and is not meant as a limitation of the present invention. In this way, it will cost less time for the integrator 206 to perform the integrating operation, and thus the whole demodulating efficiency of the demodulating apparatus 200 can be improved.

In the above embodiment, the PLL circuit 202 is implemented to recover an accurate reference clock locked to the wobble signal; however, this circuit component could be optional depending upon the design requirements. For example, when the PLL circuit 202 is excluded to reduce the cost of the demodulating apparatus 200, the integrating timing determining unit 204 is configured to determine the integrating timing points of changing the positive and negative integrating modes according to the incoming STW signal. In this case, a phase shift might occur to the outputted integrating timing points of changing the positive and negative integrating modes. As a result, the integrating result of the STW signal will be shifted due to the phase-shifted integrating timing points of changing the positive and negative integrating modes. However, when the threshold setting is properly set, the same demodulation result can be obtained. In other words, the threshold setting can be changed according to different design requirements.

Figure 6:
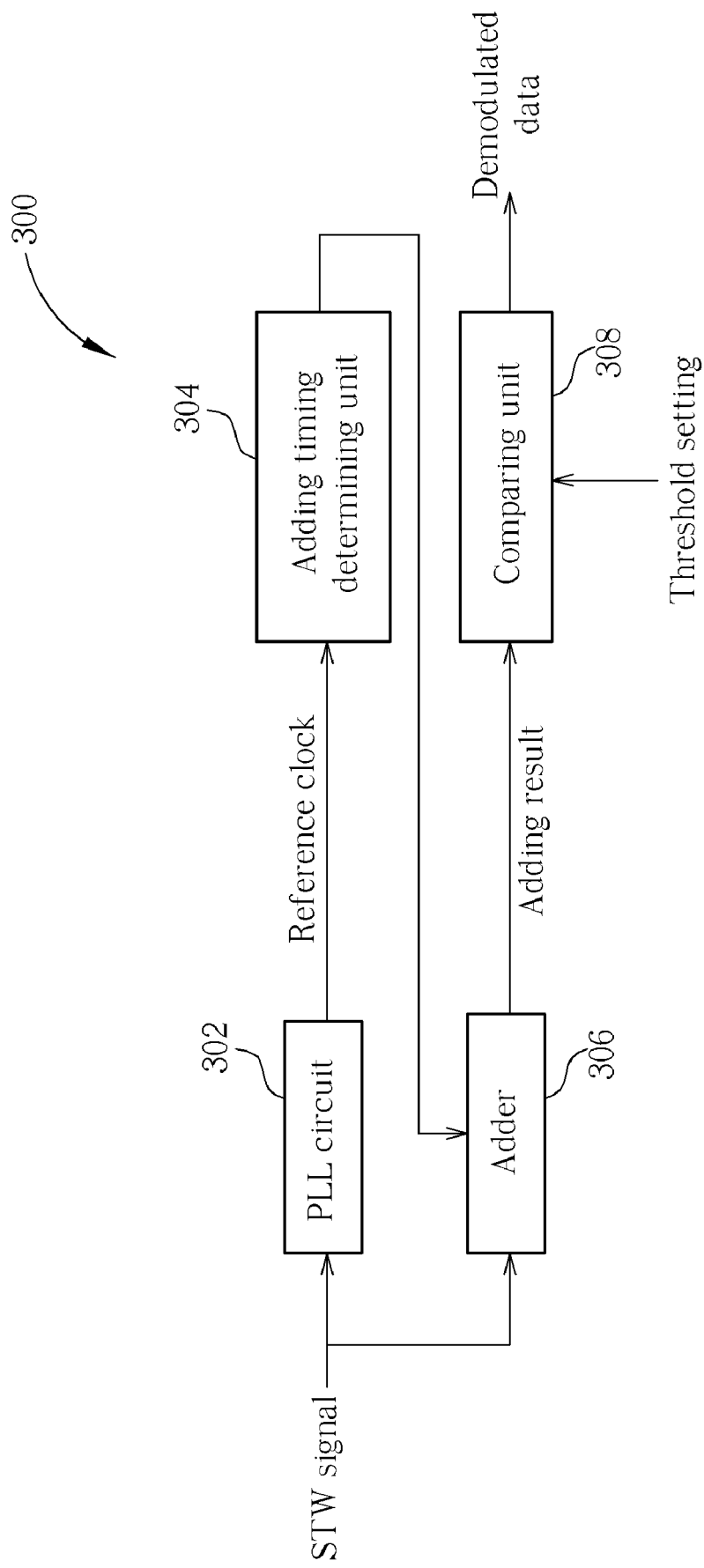
FIG. 6 shows a demodulating apparatus for demodulating an STW signal modulated from a wobble signal and a data signal in the BD according to a second embodiment of the present invention.
Figure 7:
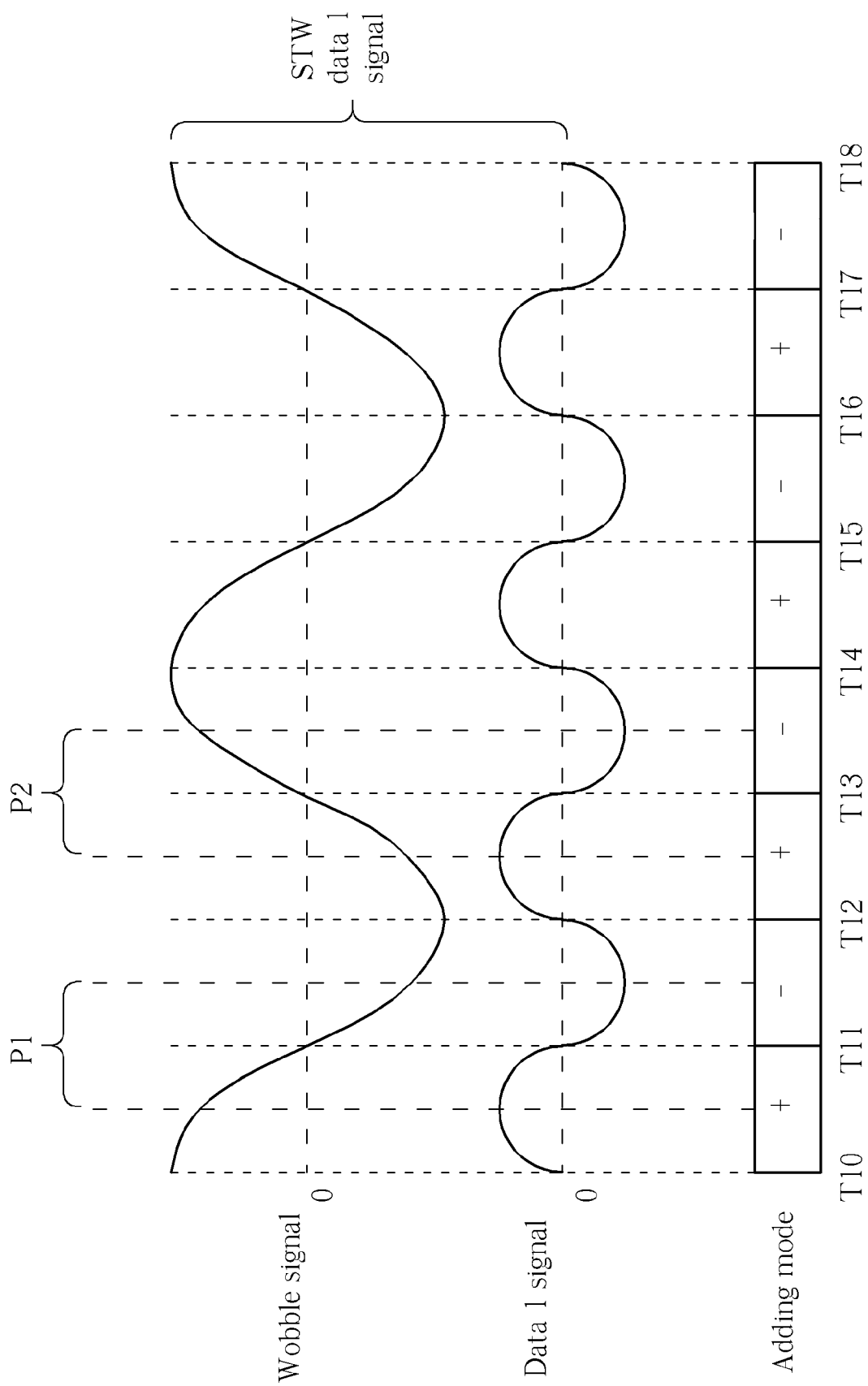
FIG. 7 shows how the present invention method demodulates an STW signal modulated from a wobble signal and a data 1 signal by performing an adding operation according to the second embodiment in FIG. 6.
Figure 8:
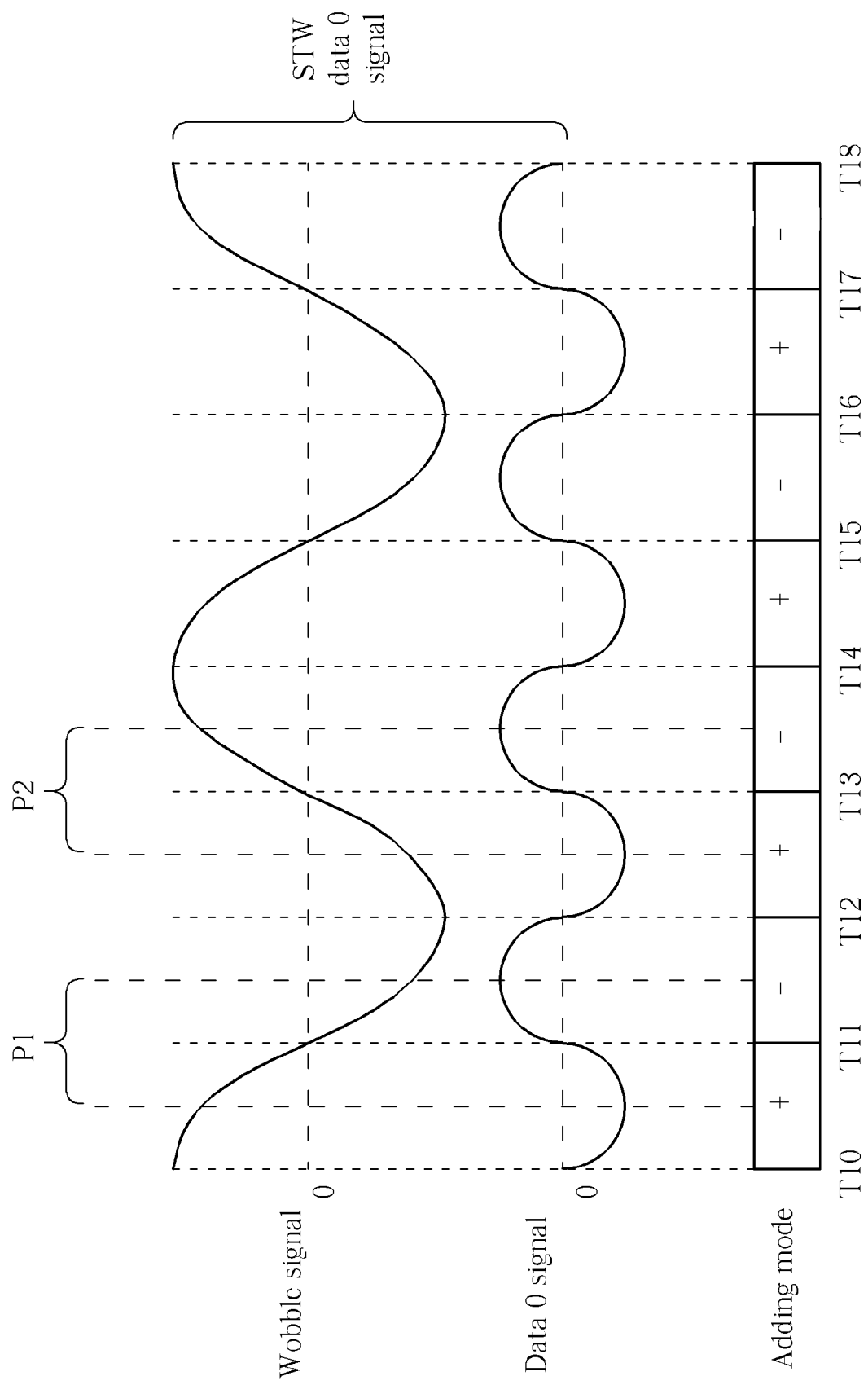
FIG. 8 shows how the present invention method demodulates an STW signal modulated from a wobble signal and a data 0 signal by performing an adding operation according to the second embodiment in FIG. 6.

Please refer to FIG. 6, FIG. 7, and FIG. 8 together. FIG. 6 shows a simplified block diagram of a demodulating apparatus 300 for demodulating the STW signal modulated from the wobble signal and the data signal in the BD according to a second embodiment of the present invention. FIG. 7 is a simplified diagram showing how the present invention method demodulates the STW signal modulated from the wobble signal and the data 1 signal (i.e. the STW data 1 signal) by performing an adding operation according to the second embodiment shown in FIG. 6, and FIG. 8 is a simplified diagram showing how the present invention method demodulates another STW signal modulated from the wobble signal and the data 0 signal (i.e. the STW data 0 signal) by performing an adding operation according to the second embodiment of FIG. 6.

As shown in FIG. 6, the demodulating apparatus 300 includes a PLL circuit 302, an adding timing determining unit 304, an adder 306, and a comparing unit 308. The PLL circuit 302 is coupled to the adding timing determining unit 304 and utilized for performing a clock recovering operation according to the STW signal and then generating a reference clock locked to the wobble signal. The adding timing determining unit 304 is utilized for determining a plurality of adding timing points of changing different adding modes according to the reference clock. The adder 306 is coupled to the adding timing determining unit 304 and utilized for generating an adding result of the STW signal according to the adding timing points and the adding modes thereof. The comparing unit 308 is coupled to the adder 306 and utilized for generating a comparing result according to at least the adding result of the STW signal and a threshold setting, and for outputting a demodulated data of the STW signal according to the comparing result. A further illustration will be described in detail in the following paragraphs with reference to FIG. 7 and FIG. 8.

As shown in waveforms of FIG. 7 and FIG. 8, the wobble signal has a wobble frequency and the data 1 signal has a first data frequency and the data 0 signal has a second data frequency, wherein both the first data frequency and the second data frequency are twice as great as the wobble frequency, and there is a phase difference of 180 degrees between the data 1 signal and the data 0 signal. The zero crossing points of the data 1 signal and the data 0 signal are the same as those of the wobble signal, and thus the STW signal will have the same zero crossing point as that of the wobble signal.

The present invention method is able to slice the wobble signal and recover the phase of the wobble signal by utilizing the PLL circuit 302, and then generate the adding timings of changing the positive and negative adding modes from the recovered phase of the wobble signal by utilizing the adding timing determining unit 304, and the operation process is similar to the related description of the PLL circuit 202 and the integrating timing determining unit 204. Thus, further explanation of the details and operations are omitted herein for the sake of brevity.

As shown in FIG. 7 and FIG. 8, the adding timing points of changing the positive and negative adding modes determined by the adding timing determining unit 304 are respectively T10, T11, T12, T13, T14, T15, T16, T17, and T18. The positive adding modes are set during respective time intervals between T10 and T11, T12 and T13, T14 and T15, and T16 and T17, and the negative adding modes are set during respective time intervals between T11 and T12, T13 and T14, T15 and T16, and T17 and T18. Therefore, when the adder 306 performs the adding operation on the STW signal according to the adding timing points (T10, T11, T12, T13, T14, T15, T16, T17, and T18) and the positive and negative adding modes thereof, the adding result of the wobble signal during the time interval between T10 and T12 will be eliminated by the adding result of the wobble signal during the time interval between T12 and T14; in the same way, the adding result of the wobble signal during the time interval between T14 and T16 will be eliminated by the adding result of the wobble signal during the time interval between T16 and T18.

However, the adding result of the data 1 signal will become a very large positive value during the time interval between T10 and T18, and the adding result of the data 0 signal will become a very large negative value during the time interval between T10 and T18. Therefore, the adding result of the STW data 1 signal generated by the adder 306 according to the adding timing points (T10, T11, T12, T13, T14, T15, T16, T17, and T18) and the positive and negative adding modes during the time interval between T10 and T18 will be equal to the adding result of the data 1 signal during the time interval between T10 and T18; and the adding result of the STW data 0 signal generated by the adder 306 according to the adding timing points (T10, T11, T12, T13, T14, T15, T16, T17, and T18) and the positive and negative adding modes during the time interval between T10 and T18 will be equal to the adding result of the data 0 signal during the time interval between T10 and T18. In other words, the adding result of the STW data 1 signal generated by the adder 306 is a very large positive value, and the adding result of the STW data 0 signal generated by the adder 306 is a very large negative value.

In addition, please note that it is not necessary for the adder 306 to perform the adding operation throughout the time interval between T10 and T18 to generate the adding result of the STW signal. For example, the adder 306 can merely perform the adding operation during the time interval P1 and P2 as shown in FIG. 7 and FIG. 8 in order to generate the adding result of the STW signal; this is only for illustration purposes and is not meant as a limitation of the present invention. In this way, less time is expended for the adder 306 to perform the adding operation, and thus the whole demodulating efficiency of the demodulating apparatus 300 can be improved.

Similar with the first embodiment, the second embodiment of the present invention also can utilize a value of zero as a threshold setting for the comparing unit 308 accordingly, and then the comparing unit 308 can be utilized for generating a comparing result according to the adding result of the STW signal and the threshold setting (i.e. zero), and for outputting a demodulated data of the STW signal according to the comparing result. In other words, if the comparing result shows that the adding result of the STW signal is much larger than zero then the comparing unit 308 will output data 1, and if the comparing result shows that the adding result of the STW signal is much smaller than zero then the comparing unit 308 will output data 0.

Please note that the threshold setting can also be changed according to different design requirements as in the first embodiment. In the second embodiment, the PLL circuit 302 is implemented to recover an accurate reference clock locked to the wobble signal; however, this circuit component could be optional depending upon the design requirements. For example, when the PLL circuit 302 is excluded in order to reduce the cost of the demodulating apparatus 300, the adding timing determining unit 304 is configured to determine the adding timing points of changing the positive and negative adding modes according to the incoming STW signal. In this case, a phase shift might occur to the outputted adding timing points of changing the positive and negative adding modes. As a result, the adding result of the STW signal will be shifted due to the phase-shifted adding timing points of changing the positive and negative adding modes.

However, when the threshold setting is properly set, the same demodulation result can be obtained. In other words, the threshold setting can be changed according to different design requirements. In addition, the second embodiment of the present invention can reduce the cost even more than the first embodiment due to the cost of the adder 306 being lower than that of the integrator 206.

Figure 9:
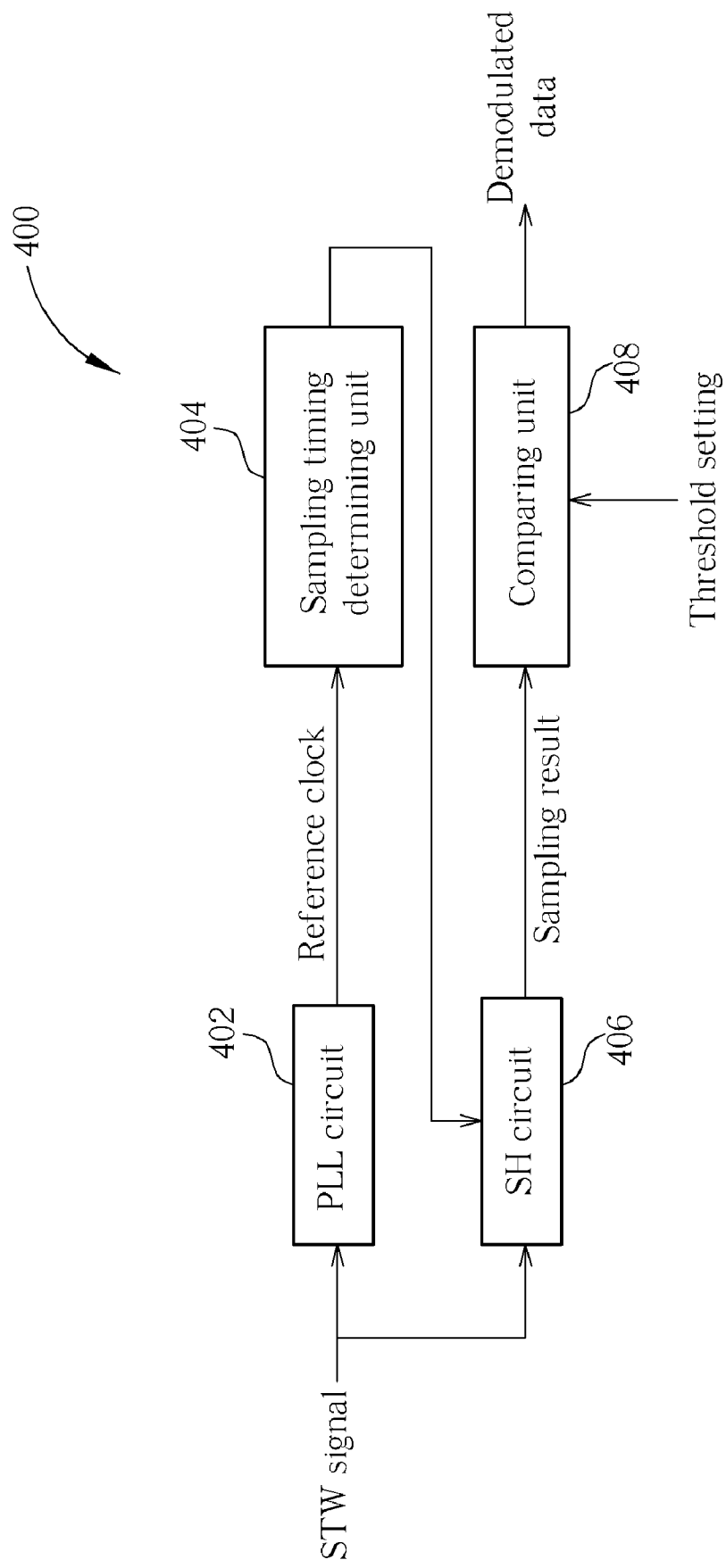
FIG. 9 shows a demodulating apparatus for demodulating an STW signal modulated from a wobble signal and a data signal in a BD according to a third embodiment of the present invention.
Figure 10:
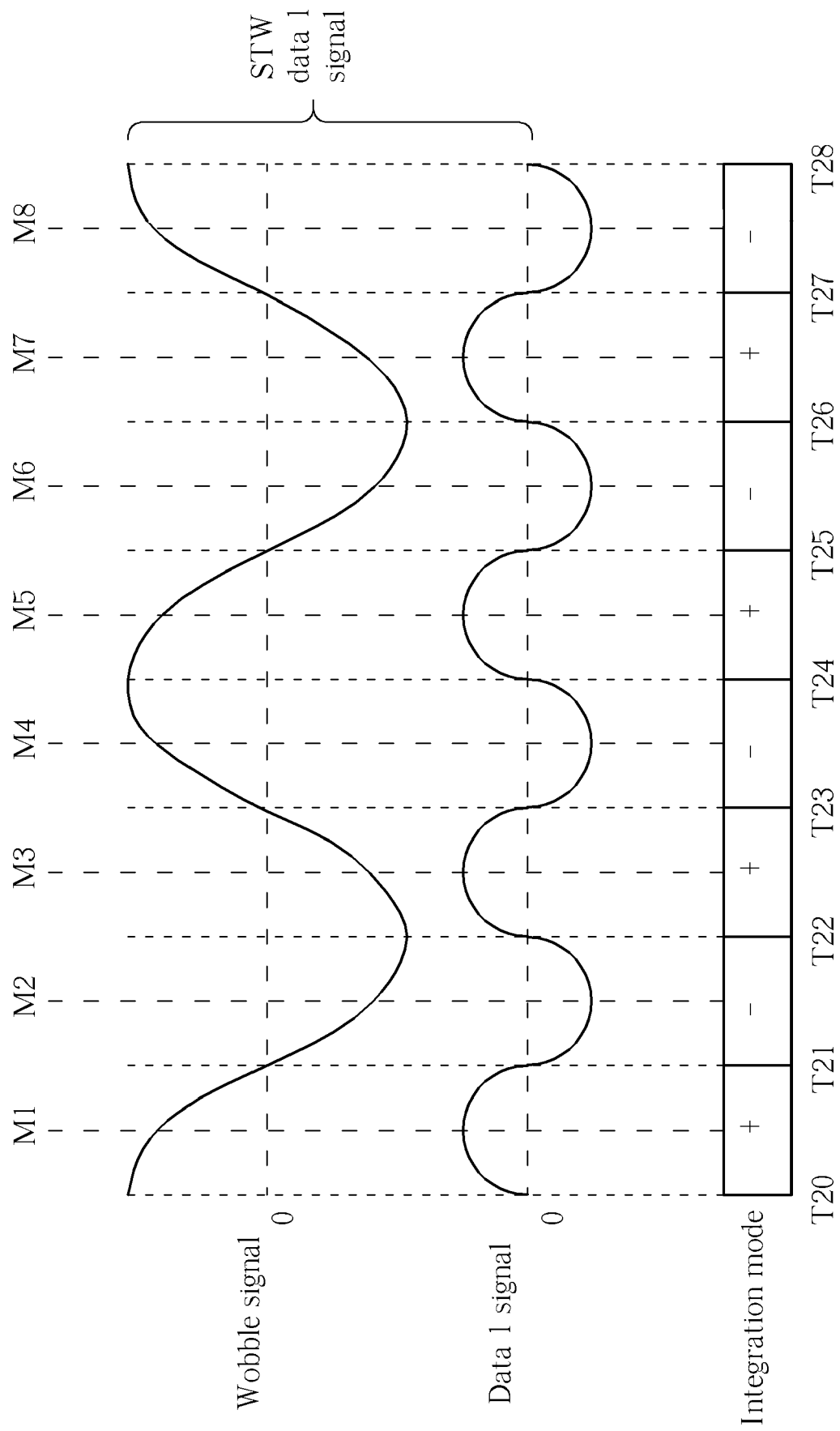
FIG. 10 shows how the present invention method demodulates an STW signal modulated from a wobble signal and a data 1 signal by performing a sampling operation according to the third embodiment in FIG. 9.
Figure 11:
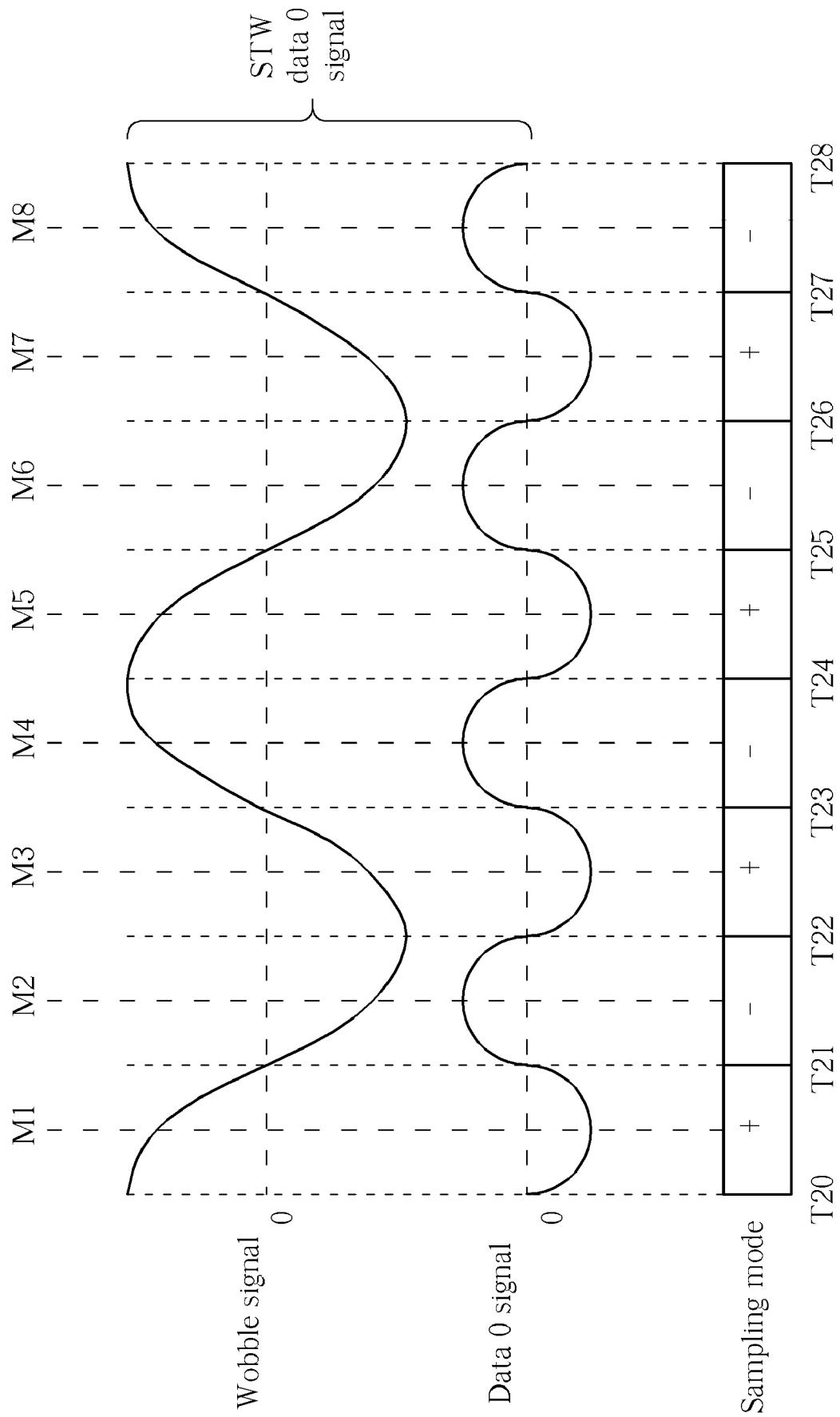
FIG. 11 shows how the present invention method demodulates an STW signal modulated from a wobble signal and a data 0 signal by performing a sampling operation according to the third embodiment in FIG. 9.

Please refer to FIG. 9, FIG. 10, and FIG. 11 together. FIG. 9 shows a simplified block diagram of a demodulating apparatus 400 for demodulating the STW signal modulated from the wobble signal and the data signal in the BD according to a third embodiment of the present invention. FIG. 10 is a simplified diagram showing how the present invention method demodulates the STW signal modulated from the wobble signal and the data 1 signal (i.e. the STW data 1 signal) by performing a sampling operation according to the third embodiment shown in FIG. 9, and FIG. 11 is a simplified diagram showing how the present invention method demodulates another STW signal modulated from the wobble signal and the data 0 signal (i.e. the STW data 0 signal) by performing a sampling operation according to the third embodiment of FIG. 9.

As shown in FIG. 9, the demodulating apparatus 400 includes a PLL circuit 402, a sampling timing determining unit 404, a sample-and-hold (SH) circuit 406, and a comparing unit 408. The PLL circuit 402 is coupled to the sampling timing determining unit 404 and utilized for performing a clock recovering operation according to the STW signal and generating a reference clock locked to the wobble signal. The sampling timing determining unit 404 is utilized for determining a plurality of sampling timing points of changing different sampling modes according to the reference clock. The SH circuit 406 is coupled to the sampling timing determining unit 404 and utilized for generating a sampling result of the STW signal according to the sampling timing points and the sampling modes thereof. The comparing unit 408 is coupled to the SH circuit 406 and utilized for generating a comparing result according to at least the sampling result of the STW signal and a threshold setting, and for outputting a demodulated data of the STW signal according to the comparing result. A further illustration will be described in detail in the following paragraphs with reference to FIG. 10 and FIG. 11.

As shown in waveforms of FIG. 10 and FIG. 11, the wobble signal has a wobble frequency and the data 1 signal has a first data frequency and the data 0 signal has a second data frequency, wherein both the first data frequency and the second data frequency are twice as great as the wobble frequency, and there is a phase difference of 180 degrees between the data 1 signal and the data 0 signal. The zero crossing points of the data 1 signal and the data 0 signal are the same as those of the wobble signal, and thus the STW signal will have the same zero crossing point as that of the wobble signal. The present invention method is able to slice the wobble signal and recover the phase of the wobble signal by utilizing the PLL circuit 402, and then generate the sampling timings of changing the positive and negative sampling modes from the recovered phase of the wobble signal by utilizing the sampling timing determining unit 404, and the operation process is similar to the related description of the PLL circuit 202 and the integrating timing determining unit 204. Thus, further explanation of the details and operations are omitted herein for the sake of brevity.

As shown in FIG. 10 and FIG. 11, the sampling timing points of changing the positive and negative sampling modes determined by the sampling timing determining unit 404 are respectively T20, T21, T22, T23, T24, T25, T26, T27, and T28. The positive sampling modes are set during respective time intervals between T20 and T21, T22 and T23, T24 and T25, and T26 and T27, and the negative sampling modes are set during respective time intervals between T21 and T22, T23 and T24, T25 and T26, and T27 and T28. Therefore, when SH circuit 406 performs the sampling operation on the STW signal according to the sampling timing points (T20, T21, T22, T23, T24, T25, T26, T27, and T28) and the positive and negative sampling modes thereof, the sampling result of the wobble signal during the time interval between T20 and T22 will be eliminated by the sampling result of the wobble signal during the time interval between T22 and T24; in the same way, the sampling result of the wobble signal during the time interval between T24 and T26 will be eliminated by the sampling result of the wobble signal during the time interval between T26 and T28.

However, the sampling result of the data 1 signal will be a very large positive value during the time interval between T20 and T28, and the sampling result of the data 0 signal will be a very large negative value during the time interval between T20 and T28. Therefore, the sampling result of the STW data 1 signal generated by the SH circuit 406 according to the sampling timing points (T20, T21, T22, T23, T24, T25, T26, T27, and T28) and the positive and negative sampling modes during the time interval between T20 and T28 will be equal to the sampling result of the data 1 signal during the time interval between T20 and T28, and the sampling result of the STW data 0 signal generated by the SH circuit 406 according to the sampling timing points (T20, T21, T22, T23, T24, T25, T26, T27, and T28) and the positive and negative sampling modes during the time section between T20 and T28 will be equal to the sampling result of the data 0 signal during the time interval between T20 and T28. In other words, the sampling result of the STW data 1 signal generated by the SH circuit 406 is a very large positive value, and the sampling result of the STW data 0 signal generated by the SH circuit 406 is a very large negative value.

In addition, please note that it is not necessary for the SH circuit 406 to perform the sampling operation throughout the time interval between T20 and T28 to generate the sampling result of the STW signal. For example, the SH circuit 406 can merely perform the sampling operation respectively at the middle points of respective time intervals between T20 and T21, T21 and T22, T22 and T23, T23 and T24, T24 and T25, T25 and T26, T26 and T27, and T27 and T28 (the middle points are represented by M1, M2, M3, M4, M5, M6, M7, and M8 shown in FIG. 7) in order to generate the sampling result of the STW signal; this is only for illustration purposes and is not meant as a limitation of the present invention. In this way, less time will be expended for the SH circuit 406 to perform the sampling operation, and thus the whole demodulating efficiency of the demodulating apparatus 400 can be improved.

As in the aforementioned first and second embodiments, the third embodiment of the present invention can also utilize a value of zero as a threshold setting for the comparing unit 408, and then the comparing unit 408 can be utilized for generating a comparing result according to the sampling result of the STW signal and the threshold setting (i.e. zero), and for outputting a demodulated data of the STW signal according to the comparing result. In other words, if the comparing result shows that the sampling result of the STW signal is much larger than zero then the comparing unit 408 will output data 1, and if the comparing result shows that the sampling result of the STW signal is much smaller than zero then the comparing unit 408 will output data 0. Please note that the threshold setting also can be changed according to different design requirements just as in the above first and second embodiments. In the third embodiment, the PLL circuit 402 is implemented to recover an accurate reference clock locked to the wobble signal.

However, this circuit component could be optional depending upon the design requirements. For example, when the PLL circuit 402 is excluded to reduce the cost of the demodulating apparatus 400, the sampling timing determining unit 404 is configured to determine the sampling timing points of changing the positive and negative sampling modes according to the incoming STW signal. In this case, a phase shift might occur to the outputted sampling timing points of changing the positive and negative sampling modes. As a result, the sampling result of the STW signal will be shifted due to the phase-shifted sampling timing points of changing the positive and negative sampling modes. When the threshold setting is properly set, however, the same demodulation result can be obtained. In other words, the threshold setting can be changed according to different design requirements. In addition, the third embodiment of the present invention can reduce the cost significantly more than the first embodiment and the second embodiment due to the cost of the SH circuit 406 being much lower than those of the adder 306 and the integrator 206.

Therefore, from the embodiments described above, the demodulating apparatus demodulates the input signal (such as the STW signal) modulated from a reference signal (such as the wobble signals in FIGS. 4, 5, 7, and 8) and a data signal (such as the data 1 signal in FIG. 4 and the data 0 signal in FIG. 5). The demodulating apparatus has a determining unit (such as the integrating timing determining unit 204, the adding timing determining unit 304, and the sampling timing determining unit 404), a calculating unit (such as the integrator 206, the adder 306, and the SH circuit 406), and a comparing unit.

The determining unit is arranged to determine a plurality of first calculating timings of different calculating modes according to the input signal, the calculating unit is arranged to generate a first calculating result of the input signal according to the calculating timings and the calculating modes thereof, and the comparing unit is arranged to generate a comparing result according to the first calculating result of the input signal and a threshold setting, and output a demodulated data of the input signal according to the comparing result.

Figure 12:
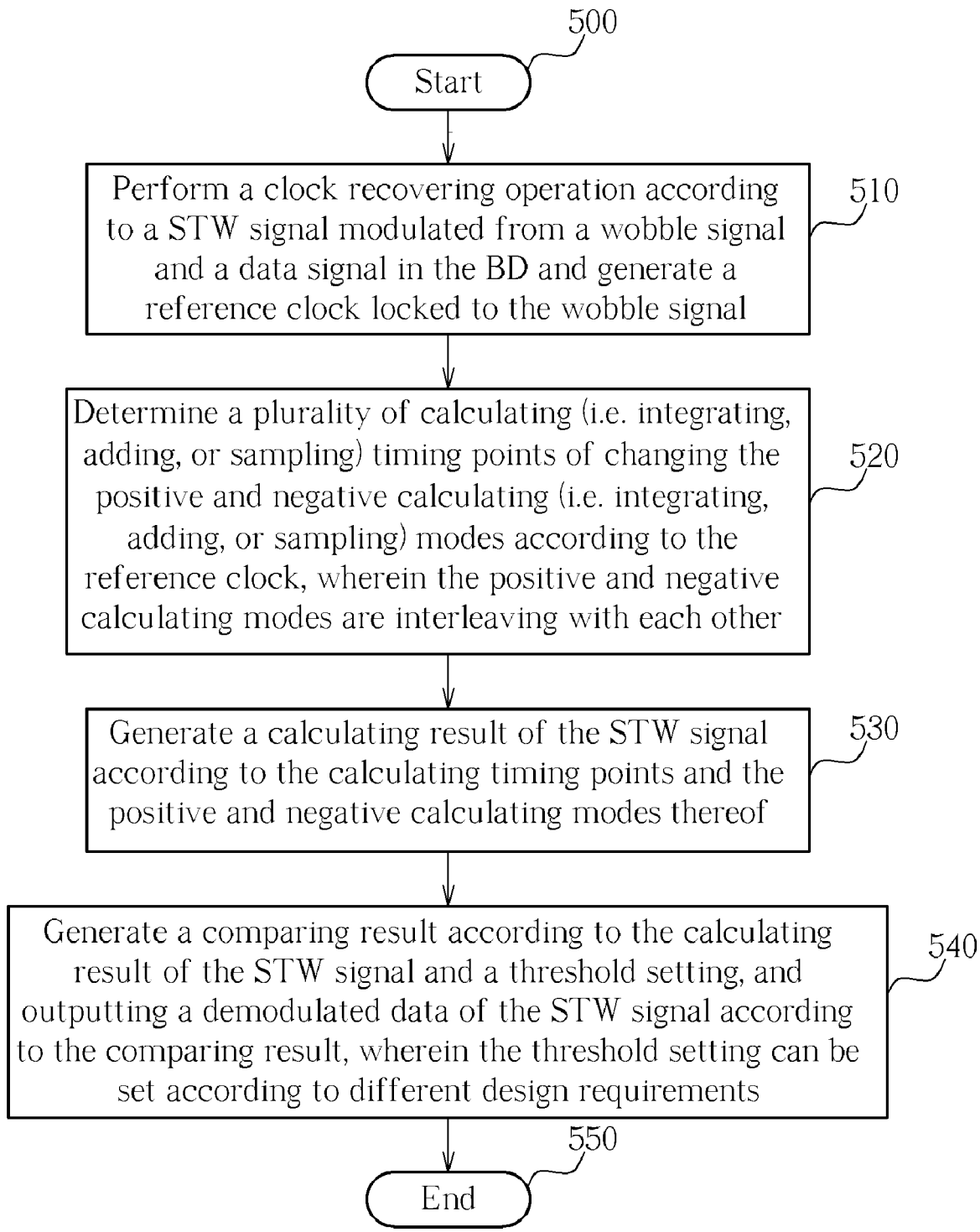
FIG. 12 is a flow chart showing an exemplary method for demodulating an STW signal modulated from a wobble signal and a data signal in a BD according to the first, second, and third embodiments of the present invention respectively.

To summarize the above operations concisely, please refer to FIG. 12. FIG. 12 is a flow chart showing an exemplary method for demodulating the STW signal modulated from the wobble signal and the data signal in the BD according to the first, second, and third embodiments of the present invention respectively. Provided that substantially the same result is achieved, the steps of the process flow chart need not be in the exact order shown and need not be contiguous, that is, other steps can be intermediate. The demodulation flow comprises the following steps:

Step 500: Start.

Step 510: Perform a clock recovering operation according to a STW signal modulated from a wobble signal and a data signal in the BD and generate a reference clock locked to the wobble signal.

Step 520: Determine a plurality of calculating (i.e. integrating, adding, or sampling) timing points of changing the positive and negative calculating modes (i.e. integrating, adding, or sampling) according to the reference clock, wherein the positive and negative calculating modes interleave with each other.

Step 530: Generate a calculating result of the STW signal according to the calculating timing points and the positive and negative calculating modes thereof.

Step 540: Generate a comparing result according to the calculating result of the STW signal and a threshold setting, and output a demodulated data of the STW signal according to the comparing result, wherein the threshold setting can be set according to different design requirements.

Step 550: End

Figure 13:
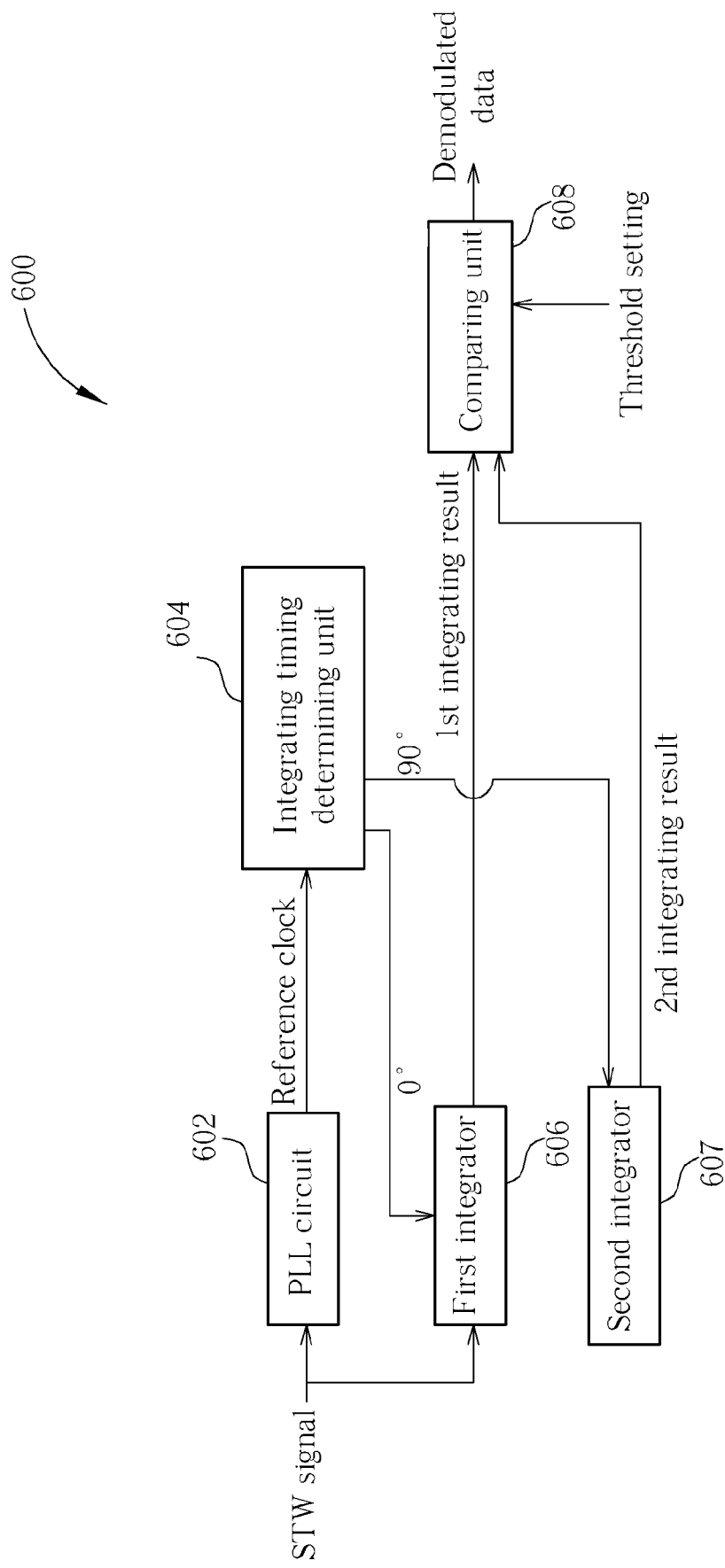
FIG. 13 shows a demodulating apparatus 600 for demodulating an STW signal modulated from a wobble signal and a data signal in a BD according to a fourth embodiment of the present invention.
Figure 14:
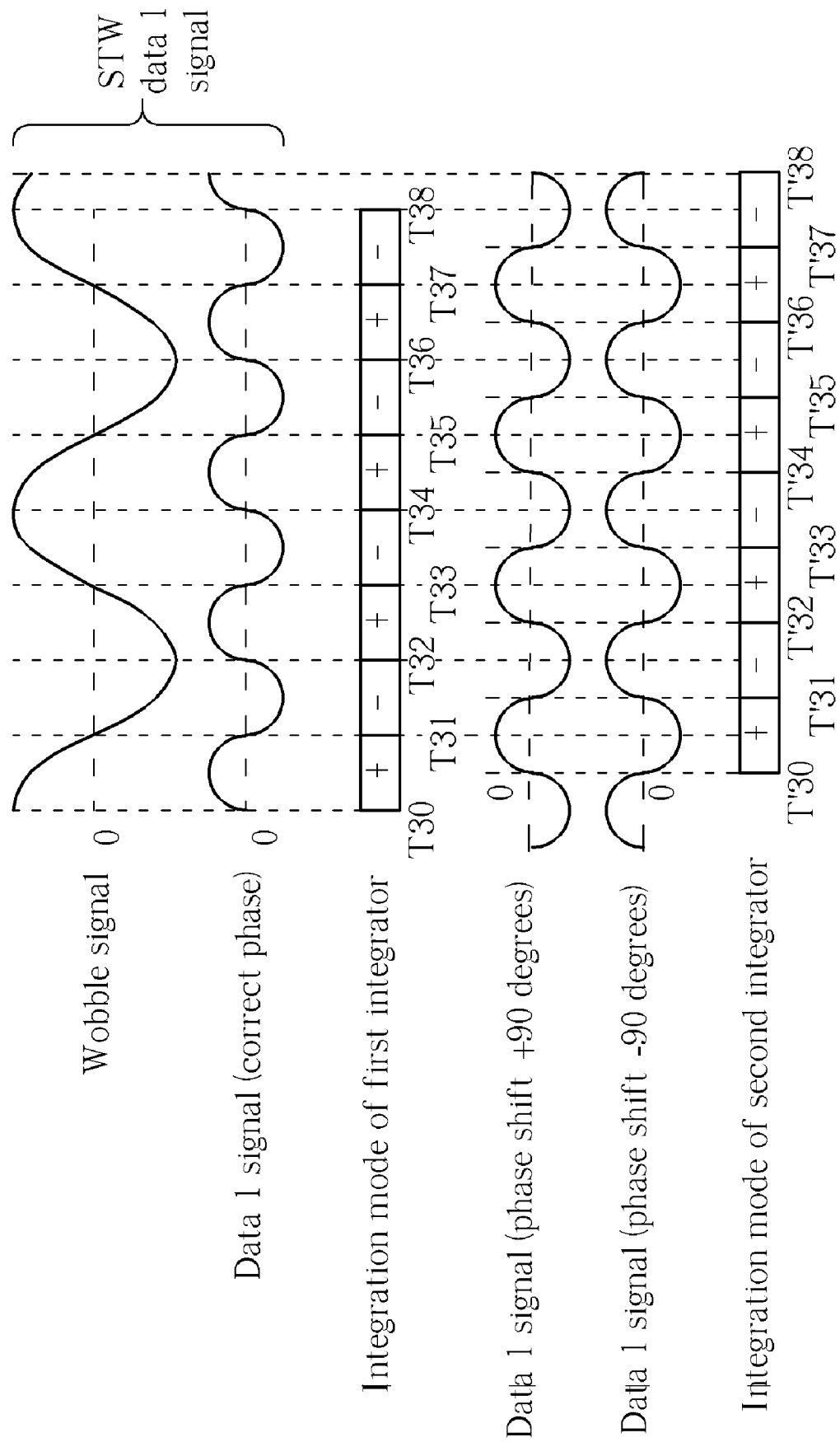
FIG. 14 shows how the present invention method demodulates an STW signal modulated from a wobble signal and a data 1 signal by performing an integrating operation according to the fourth embodiment in FIG. 13.
Figure 15:
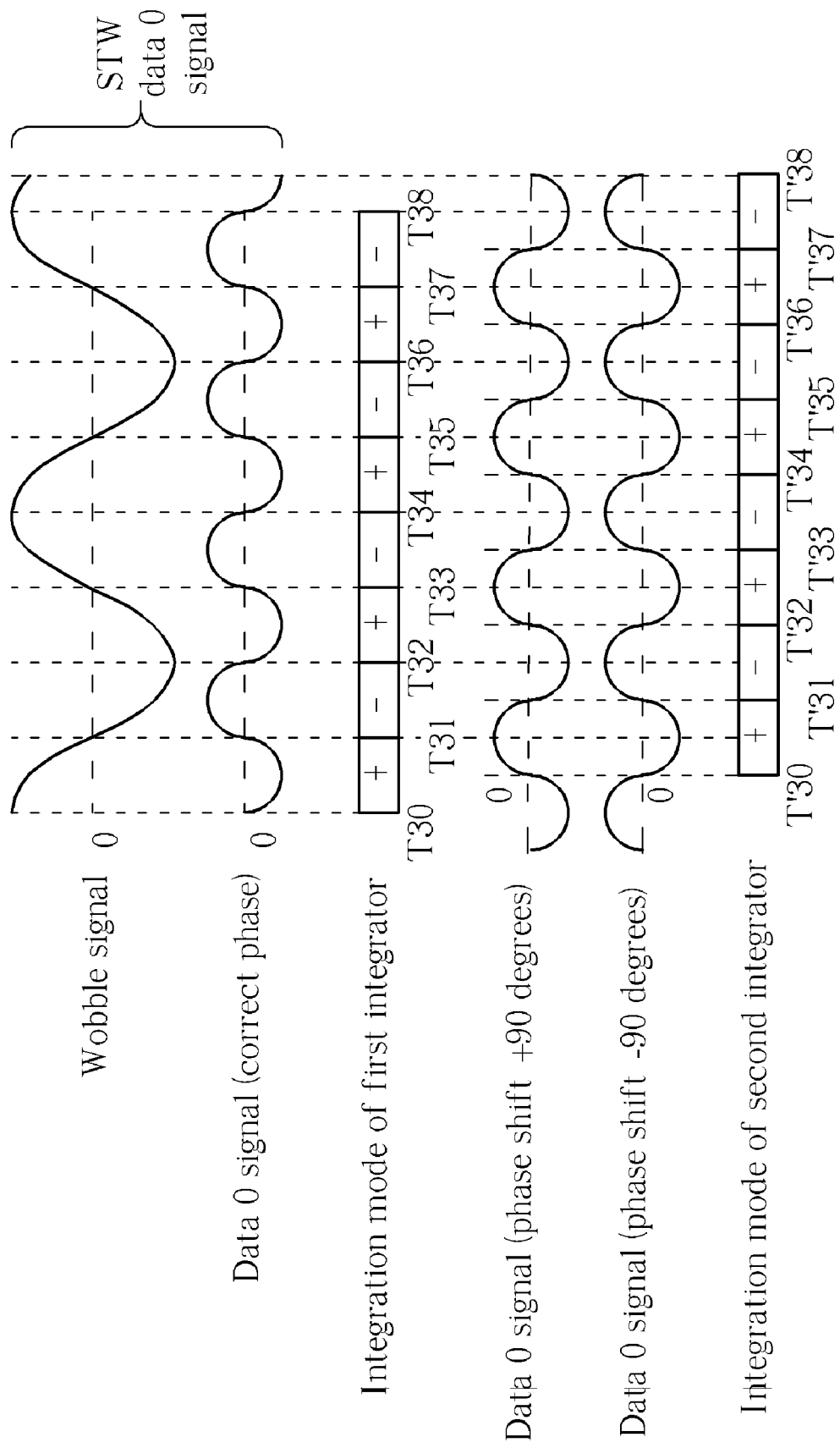
FIG. 15 shows how the present invention method demodulates an STW signal modulated from a wobble signal and a data 0 signal by performing an integrating operation according to the fourth embodiment in FIG. 13.

Please refer to FIG. 13, FIG. 14, and FIG. 15 together. FIG. 13 shows a simplified block diagram of a demodulating apparatus 600 for demodulating the STW signal modulated from the wobble signal and the data signal in the BD according to a fourth embodiment of the present invention. FIG. 14 is a simplified diagram showing how the present invention method demodulates the STW signal modulated from the wobble signal and the data 1 signal (i.e. the STW data 1 signal) by performing an integrating operation according to the fourth embodiment shown in FIG. 13, and FIG. 15 is a simplified diagram showing how the present invention method demodulates another STW signal modulated from the wobble signal and the data 0 signal (i.e. the STW data 0 signal) by performing an integrating operation according to the fourth embodiment shown in FIG. 13.

As shown in FIG. 13, the demodulating apparatus 600 includes a PLL circuit 602, an integrating timing determining unit 604, a first integrator 606, a second integrator 607, and a comparing unit 608. The PLL circuit 602 is coupled to the integrating timing determining unit 604 and utilized for performing a clock recovering operation according to the STW signal and generating a reference clock locked to the wobble signal. The integrating timing determining unit 604 is utilized for determining a plurality of first integrating timing points of changing different integrating modes for the first integrator 606 and a plurality of second integrating timing points of changing different integrating modes for the second integrator 607 according to the reference clock, wherein a phase difference between the first calculating timings and the second calculating timings is 90 degrees. The first integrator 606 is coupled to the integrating timing determining unit 604 and utilized for generating a first integrating result of the STW signal according to the first integrating timing points and the corresponding integrating modes thereof. The second integrator 607 is coupled to the integrating timing determining unit 604 and utilized for generating a second integrating result of the STW signal according to the second integrating timing points and the corresponding integrating modes thereof. The comparing unit 608 is coupled to the first integrator 606 and the second integrator 607 and utilized for generating a comparing result according to the first integrating result, the second integrating result, and a threshold setting, and for outputting a demodulated data of the STW signal according to the comparing result. A further illustration will be described in detail in the following paragraphs with reference to FIG. 14 and FIG. 15.

As shown in waveforms of FIG. 14 and FIG. 15, the wobble signal has a wobble frequency, the data 1 signal has a first data frequency and the data 0 signal has a second data frequency, wherein both the first data frequency and the second data frequency are twice as great as the wobble frequency, and there is a phase difference of 180 degrees between the data 1 signal and the data 0 signal. Please note that there is possibly a phase shift between the wobble signal and the data 1 signal and between the wobble signal and the data 0 signal respectively since the adjacent tracks on the BD might affect the phases of the wobble signal, the data 1 signal, and the data 0 signal in different ways. It should be noted that the phase shift varies depending upon actual conditions; however, to better illustrate the operation of the demodulating apparatus 600, the phase shift equal to +90 degrees or −90 degrees is taken as an example in the following description for illustrative purposes.

The present invention method is able to slice the wobble signal and recover the phase of the wobble signal by utilizing the PLL circuit 602, and then generate the integrating timings of changing the positive and negative integrating modes from the recovered phase of the wobble signal by utilizing the integrating timing determining unit 604 for the first integrator 606 and the second integrator 607 respectively, and the operation process is similar to the related description of the PLL circuit 202 and the integrating timing determining unit 204. Thus, further explanation of the details and operations are omitted herein for the sake of brevity.

As shown in FIG. 14 and FIG. 15, the first integrating timing points of changing the positive and negative integrating modes determined by the integrating timing determining unit 604 for the first integrator 606 are respectively T30, T31, T32, T33, T34, T35, T36, T37, and T38; the second integrating timing points of changing the positive and negative integrating modes determined by the integrating timing determining unit 604 for the second integrator 607 are respectively T'30, T'31, T'32, T'33, T'34, T'35, T'36, T'37, and T'38. The positive integrating modes are set during the time intervals between T30 and T31, T32 and T33, T34 and T35, and T36 and T37, T'30 and T'31, T'32 and T'33, T'34 and T'35, and T'36 and T'37, and the negative integrating modes are set during the time intervals between T31 and T32, T33 and T34, T35 and T36, and T37 and T38, T'31 and T'32, T'33 and T'34, T'35 and T'36, and T'37 and T'38.

Therefore, in a case where the data 1 signal and the data 0 signal have no phase shift, when the first integrator 606 performs the integrating operation on the STW signal according to the first integrating timing points (T30, T31, T32, T33, T34, T35, T36, T37, and T38) and the corresponding positive and negative integrating modes thereof, the integrating result of the wobble signal during the time interval between T30 and T38 will be zero just as in FIG. 3; similarly, when the second integrator 607 performs the integrating operation on the STW signal according to the second integrating timing points (T'30, T'31, T'32, T'33, T'34, T'35, T'36, T'37, and T'38) and the corresponding positive and negative integrating modes thereof, the integrating result of the wobble signal during the time interval between T'30 and T'38 will also be zero.

However, the integrating result of the data 1 signal generated by the first integrator 606 will become a very large positive value during the time interval between T30 and T38, and the integrating result of the data 0 signal generated by the first integrator 606 will become a very large negative value during the time interval between T30 and T38; additionally, both the integrating results of the data 1 signal and the data 0 signal generated by the second integrator 607 will be zero during the time interval between T'30 and T'38. In other words, the first integrating result of the STW data 1 signal generated by the first integrator 606 is a very large positive value, and the first integrating result of the STW data 0 signal generated by the first integrator 606 is a very large negative value, where both the second integrating results of the data 1 signal and the data 0 signal generated by the second integrator 607 are zero. In this way, data 0 or data 1 carried by the STW signal can be identified correctly according to the integrating results generated by the first and second integrators 606 and 607 when the phase shift occurs.

In another case where the data 1 signal and the data 0 signal have a phase shift of +90 degrees, when the first integrator 606 performs the integrating operation on the STW signal according to the first integrating timing points (T30, T31, T32, T33, T34, T35, T36, T37, and T38) and the corresponding positive and negative integrating modes thereof, the integrating result of the wobble signal during the time interval between T30 and T38 will be zero; similarly, when the second integrator 607 performs the integrating operation on the STW signal according to the second integrating timing points (T'30, T'31, T'32, T'33, T'34, T'35, T'36, T'37, and T'38) and the corresponding positive and negative integrating modes thereof, the integrating result of the wobble signal during the time interval between T'30 and T'38 will also be zero.

However, the integrating result of the data 1 signal generated by the second integrator 607 will become a very large positive value during the time interval between T'30 and T'38, and the integrating result of the data 0 signal generated by the second integrator 607 will become a very large negative value during the time interval between T'30 and T'38, and both the integrating results of the data 1 signal and the data 0 signal generated by the first integrator 606 will be zero during the time interval between T30 and T38. In other words, the first integrating result of the STW data 1 signal generated by the second integrator 607 is a very large positive value, and the first integrating result of the STW data 0 signal generated by the second integrator 607 is a very large negative value, where both the second integrating results of the data 1 signal and the data 0 signal generated by the first integrator 606 are zero. In this way, data 0 or data 1 carried by the STW signal can be identified correctly according to the integrating results generated by the first and second integrators 606 and 607 when the phase shift occurs.

In yet another case where the data 1 signal and the data 0 signal have a phase shift of −90 degrees, when the first integrator 606 performs the integrating operation on the STW signal according to the first integrating timing points (T30, T31, T32, T33, T34, T35, T36, T37, and T38) and the corresponding positive and negative integrating modes thereof, the integrating result of the wobble signal during the time interval between T30 and T38 will be zero; similarly, when the second integrator 607 performs the integrating operation on the STW signal according to the second integrating timing points (T'30, T'31, T'32, T'33, T'34, T'35, T'36, T'37, and T'38) and the corresponding positive and negative integrating modes thereof, the integrating result of the wobble signal during the time interval between T'30 and T'38 will also be zero. The integrating result of the data 1 signal generated by the second integrator 607, however, will become a very large negative value during the time interval between T'30 and T'38, and the integrating result of the data 0 signal generated by the second integrator 607 will become a very large positive value during the time interval between T'30 and T'38, and both the integrating results of the data 1 signal and the data 0 signal generated by the first integrator 606 will be zero during the time interval between T30 and T38.

In other words, the first integrating result of the STW data 1 signal generated by the second integrator 607 is a very large negative value, and the first integrating result of the STW data 0 signal generated by the second integrator 607 is a very large positive value, where both the second integrating results of the data 1 signal and the data 0 signal generated by the first integrator 606 are zero. In this way, data 0 or data 1 carried by the STW signal can be identified correctly according to the integrating results generated by the first and second integrators 606 and 607 when the phase shift occurs.

In addition, please refer to FIG. 16. FIG. 16 shows an arrangement of an address in pre-groove (ADIP) word according to BD specifications. As shown in FIG. 16, the reference units at ADIP unit number 8, 13, 18, . . . , 78 are always modulated with the STW data 0 signal and can be used for calibration. The data_x unit can be a data_0 unit modulated with the STW data 0 signal or a data_1 unit modulated with the STW data 1 signal. Thus, the reference unit can be used for calibration for the following four data_x units.

The present invention method can utilize the first integrator 606 to generate a first reference integrating result of the STW signal of the reference unit (i.e. the STW data 0 signal) according to the first integrating timing points (T30, T31, T32, T33, T34, T35, T36, T37, and T38) and utilize the second integrator 607 to generate a second reference integrating result of the STW signal of the reference unit (i.e. the STW data 0 signal) according to the second integrating timing points (T'30, T'31, T'32, T'33, T'34, T'35, T'36, T'37, and T'38). Then, the present invention method can define the threshold setting according to the first reference integrating result and the second reference integrating result and store the threshold setting in the comparing unit 608 as a comparison reference when demodulating the STW signals of the data_x units.

Figure 17:
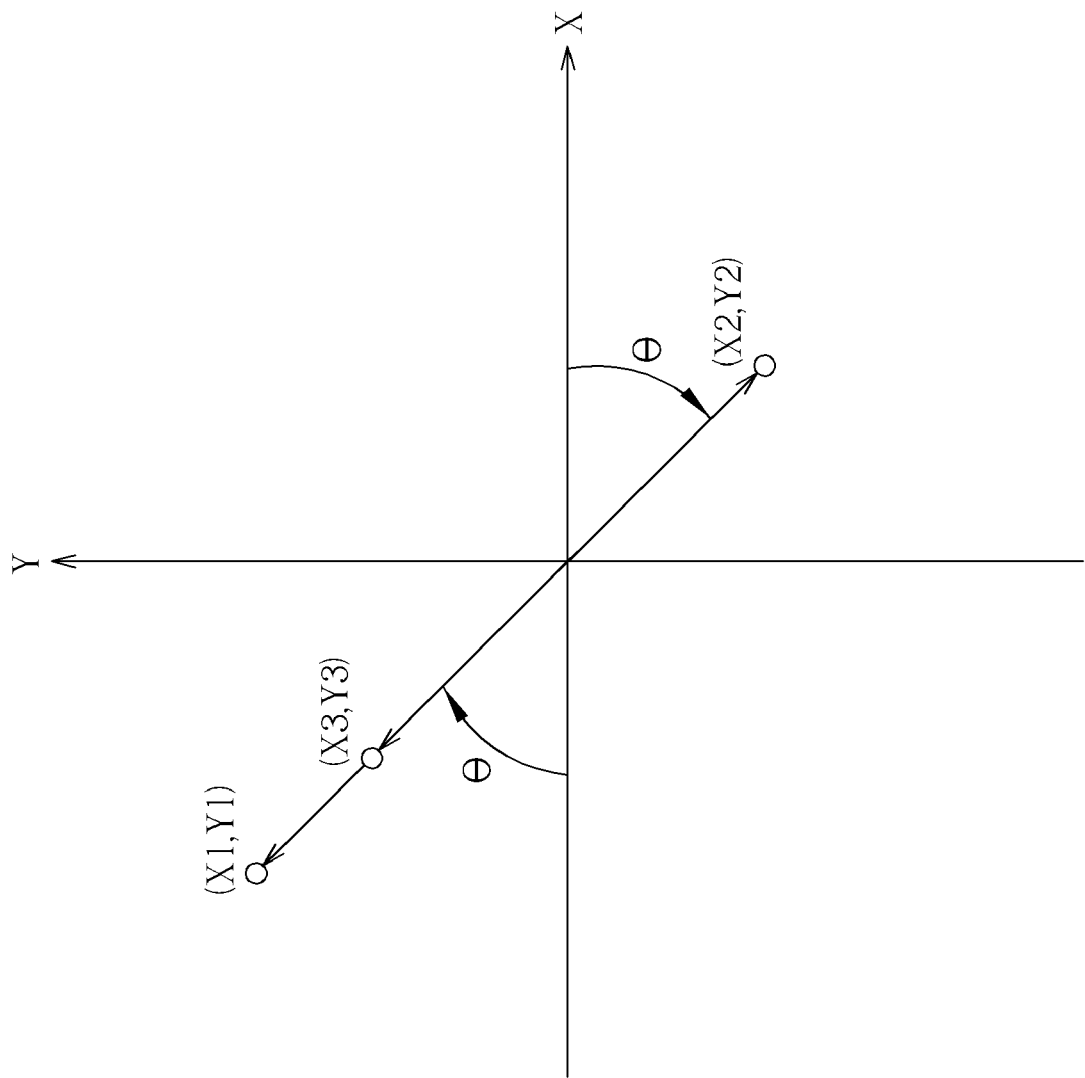
FIG. 17 shows an illustration of how the present invention method utilizes a threshold setting defined according to a first reference integrating result and a second reference integrating result to demodulate STW signals of data_x units.

Please refer to FIG. 17 for a further illustration about how the present invention method utilizes the threshold setting defined according to the first reference integrating result and the second reference integrating result to demodulate the STW signals of the data_x units. As shown in FIG. 17, assume the first reference integrating result and the second reference integrating result of the STW data 0 signal of the reference unit generated by the first integrator 606 and the second integrator 607 respectively are X1 and Y1, and then the threshold setting is set as a vector (X1, Y1). For example, when the first integrating result and the second integrating result of the STW signal of a data_x unit generated by the first integrator 606 and the second integrator 607 respectively are X2 and Y2, a comparing result generated by the comparing unit 608 according to the first integrating result, the second integrating result, and the threshold setting can determine the demodulated data of the STW signal is data 1 (i.e. the data_x unit is a data_1 unit) since an included angle between the vector (X2, Y2) and the vector (X1, Y1) is known to be 180 degrees utilizing mathematical operations including, but not limited to, a vector inner product operation on the vector (X2, Y2) and the vector (X1, Y1).

When the first integrating result and the second integrating result of the STW signal of another data_x unit generated by the first integrator 606 and the second integrator 607 respectively are X3 and Y3, the comparing result generated by the comparing unit 608 according to the first integrating result, the second integrating result, and the threshold setting can determine the demodulated data of the STW signal is data 0 (i.e. the data_x unit is a data_0 unit) since an included angle between the vector (X3, Y3) and the vector (X1, Y1) is known to be 0 degree utilizing mathematical operations including, but not limited to, a vector inner product operation on the vector (X3, Y3) and the vector (X1, Y1). In addition, please note that the angle Θ is representative of the induced phase shift of the STW data 0 signal of the reference unit and the STW signals of the data_x units.

In addition, please note that it is not necessary for the first integrator 606 to perform the integrating operation throughout the time interval between T30 and T38 in order to generate the first integrating result of the STW signal; similarly, the second integrator 607 is not limited to perform the second integrating operation throughout the time interval between T'30 and T'38 in order to generate the second integrating result of the STW signal. For example, the first integrator 606 can merely perform the first integrating operation during the time section between T30 and T34 in order to generate the first integrating result of the STW signal, and the second integrator 607 can merely perform the second integrating operation during the time section between T'30 and T'34 in order to generate the second integrating result of the STW signal; this is only for illustration purposes and is not meant as a limitation of the present invention. In this way, less time will be expended for the first integrator 606 to perform the first integrating operation and the second integrator 607 to perform the second integrating operation, and thus the whole demodulating efficiency of the demodulating apparatus 600 can be improved.

Figure 18:
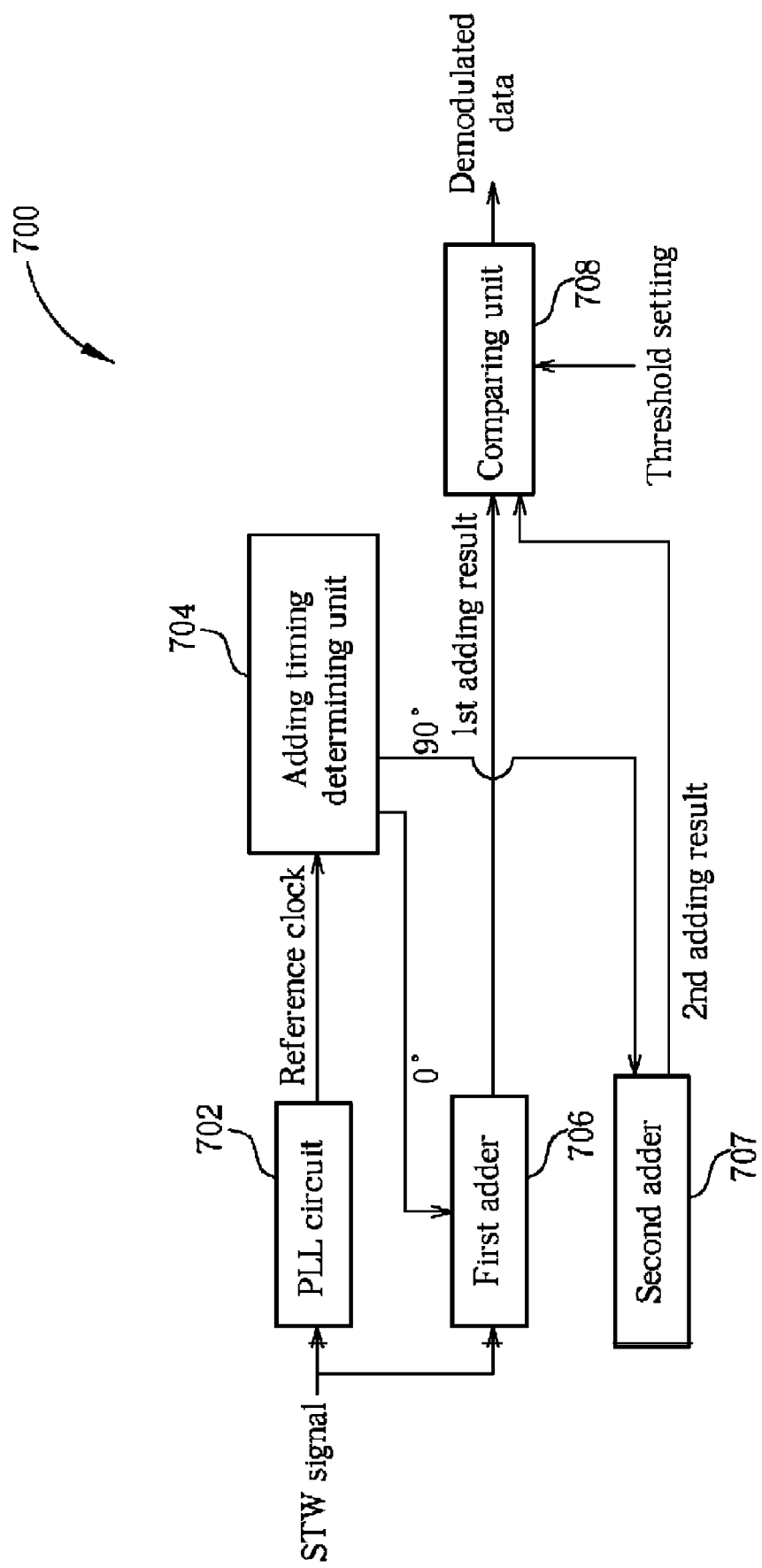
FIG. 18 shows a demodulating apparatus for demodulating an STW signal modulated from a wobble signal and a data signal in a BD according to a fifth embodiment of the present invention.

Please refer to FIG. 18. FIG. 18 shows a simplified block diagram of a demodulating apparatus 700 for demodulating the STW signal modulated from the wobble signal and the data signal in the BD according to a fifth embodiment of the present invention. As shown in FIG. 18, the demodulating apparatus 700 includes a PLL circuit 702, an adding timing determining unit 704, a first adder 706, a second adder 707, and a comparing unit 708. The PLL circuit 702 is coupled to the adding timing determining unit 704 and utilized for performing a clock recovering operation according to the STW signal and generating a reference clock locked to the wobble signal. The adding timing determining unit 704 is utilized for determining a plurality of first adding timing points of changing different adding modes for the first adder 706 and a plurality of second adding timing points of changing different adding modes for the second adder 707 according to the reference clock, wherein a phase difference between the first calculating timings and the second calculating timings is 90 degrees.

The first adder 706 is coupled to the adding timing determining unit 704 and utilized for generating a first adding result of the STW signal according to the first adding timing points and the adding modes thereof. The second adder 707 is coupled to the adding timing determining unit 704 and utilized for generating a second adding result of the STW signal according to the second adding timing points and the adding modes thereof. The comparing unit 708 is coupled to the first adder 706 and the second adder 707 and utilized for generating a comparing result according to the first adding result, the second adding result, and a threshold setting, and for outputting a demodulated data of the STW signal according to the comparing result. Please note that the relation and difference between the fourth embodiment and the fifth embodiment of the present invention are just like the relation and difference between the first embodiment and the second embodiment of the present invention. Thus, a further description of the fifth embodiment of the present invention is omitted herein for the sake of brevity.

Figure 19:
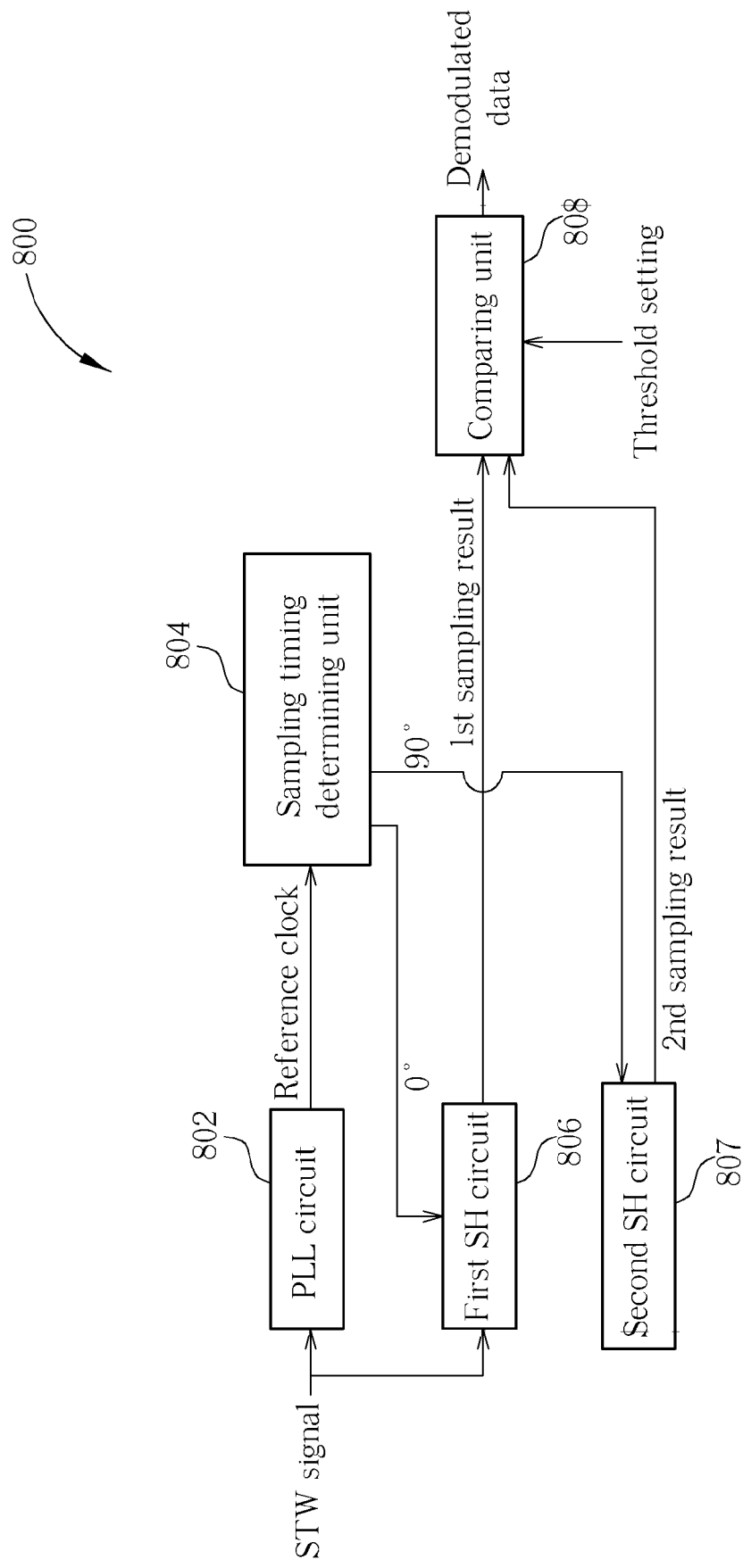
FIG. 19 shows a demodulating apparatus for demodulating an STW signal modulated from a wobble signal and a data signal in a BD according to a sixth embodiment of the present invention.

Please refer to FIG. 19. FIG. 19 shows a simplified block diagram of a demodulating apparatus 800 for demodulating the STW signal modulated from the wobble signal and the data signal in the BD according to a sixth embodiment of the present invention. As shown in FIG. 19, the demodulating apparatus 800 includes a PLL circuit 802, an adding timing determining unit 804, a first adder 806, a second adder 807, and a comparing unit 808. The PLL circuit 802 is coupled to the adding timing determining unit 804 and utilized for performing a clock recovering operation according to the STW signal and generating a reference clock locked to the wobble signal. The adding timing determining unit 804 is utilized for determining a plurality of first adding timing points of changing different adding modes for the first adder 806 and a plurality of second adding timing points of changing different adding modes for the second adder 807 according to the reference clock, wherein a phase difference between the first calculating timings and the second calculating timings is 90 degrees.

The first adder 806 is coupled to the adding timing determining unit 804 and utilized for generating a first adding result of the STW signal according to the first adding timing points and the adding modes thereof. The second adder 807 is coupled to the adding timing determining unit 804 and utilized for generating a second adding result of the STW signal according to the second adding timing points and the adding modes thereof. The comparing unit 808 is coupled to the first adder 806 and the second adder 807 and utilized for generating a comparing result according to the first adding result, the second adding result, and a threshold setting, and for outputting a demodulated data of the STW signal according to the comparing result. Please note that the relation and difference between the fourth embodiment and the sixth embodiment of the present invention are just like the relation and difference between the first embodiment and the third embodiment of the present invention. Thus, a further description of the sixth embodiment of the present invention is omitted herein for the sake of brevity.

Figure 20:
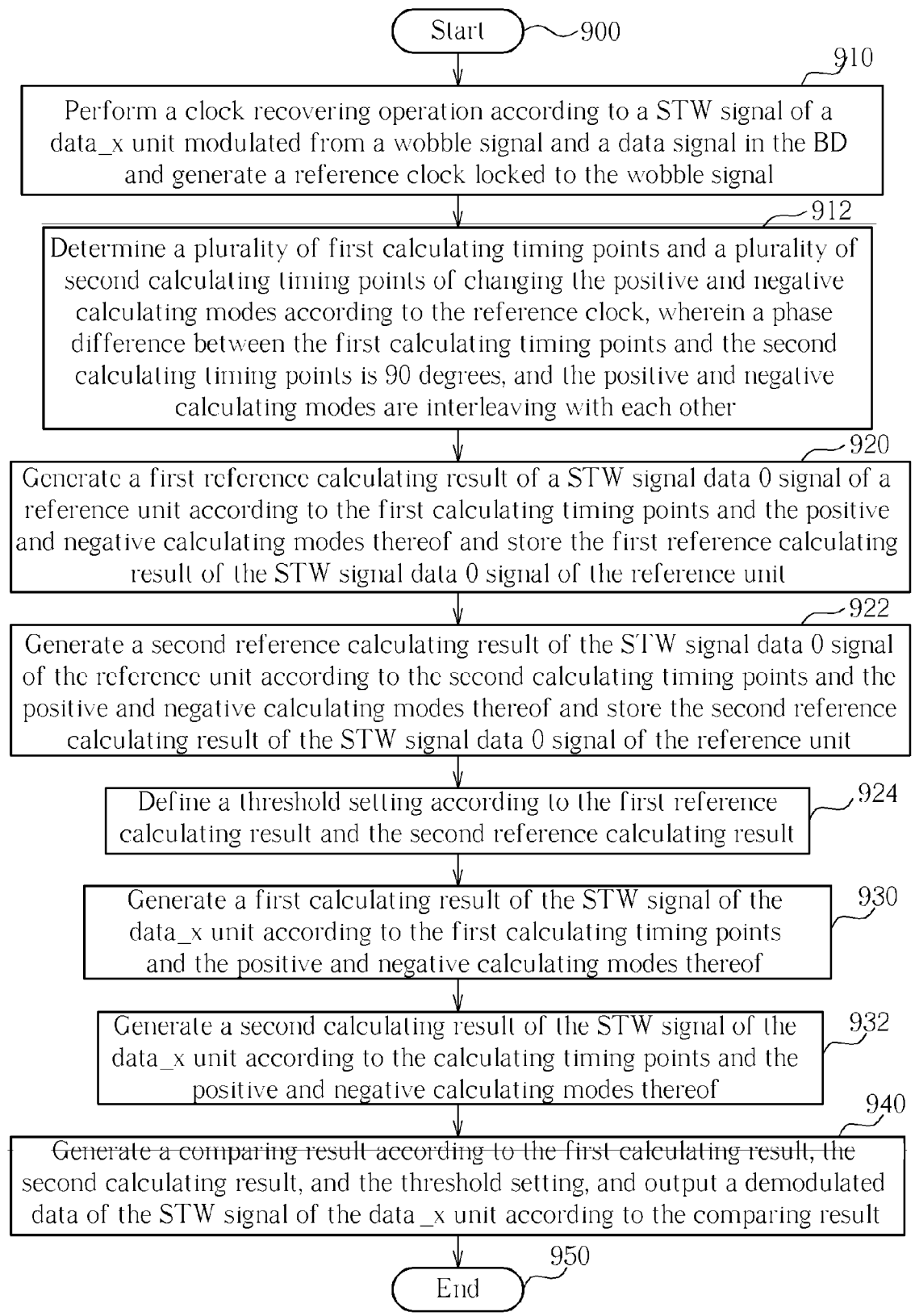
FIG. 20 is a flow chart showing an exemplary method for demodulating an STW signal modulated from a wobble signal and a data signal in a BD according to the fourth, fifth, and sixth embodiments of the present invention respectively.

To summarize the above operations concisely, please refer to FIG. 20. FIG. 20 is a flow chart showing an exemplary method for demodulating the STW signal modulated from the wobble signal and the data signal in the BD according to the fourth, fifth, and sixth embodiments of the present invention respectively. Provided that substantially the same result is achieved, the steps of the process flow chart need not be in the exact order shown and need not be contiguous, that is, other steps can be intermediate. The demodulation flow comprises the following steps:

Step 900: Start.

Step 910: Perform a clock recovering operation according to a STW signal of a data_x unit modulated from a wobble signal and a data signal in the BD and generate a reference clock locked to the wobble signal.

Step 912: Determine a plurality of first calculating (i.e. integrating, adding, or sampling) timing points and a plurality of second calculating timing points of changing the positive and negative calculating (i.e. integrating, adding, or sampling) modes according to the reference clock, wherein a phase difference between the first calculating timing points and the second calculating timing points is 90 degrees, and the positive and negative calculating modes interleave with each other.

Step 920: Generate a first reference calculating result of a STW signal data 0 signal of a reference unit according to the first calculating timing points and the positive and negative calculating modes thereof and store the first reference calculating result of the STW signal data 0 signal of the reference unit.

Step 922: Generate a second reference calculating result of the STW signal data 0 signal of the reference unit according to the second calculating timing points and the positive and negative calculating modes thereof and store the second reference calculating result of the STW signal data 0 signal of the reference unit.

Step 924: Define a threshold setting according to the first reference calculating result and the second reference calculating result.

Step 930: Generate a first calculating result of the STW signal of the data_x unit according to the first calculating timing points and the positive and negative calculating modes thereof.

Step 932: Generate a second calculating result of the STW signal of the data_x unit according to the calculating timing points and the positive and negative calculating modes thereof.

Step 940: Generate a comparing result according to the first calculating result, the second calculating result, and the threshold setting, and output a demodulated data of the STW signal of the data_x unit according to the comparing result.

Step 950: End.

It is noted that the procedure in the flowcharts 12 and 19 are not fixed, the persons skilled in the art will readily observe that numerous modifications and alterations. For example, the steps 920 and 922 can be processed simultaneously; therefore the first and second reference calculating results can be generated at the same time.

Briefly summarized, since the cost of the calculating units utilized by the present invention such as the integrator, the adder, or the SH circuit is much lower than the band-pass filter and the multiplier adopted in the conventional demodulation scheme, the present invention can offer an efficient and economical solution for demodulating the STW signal modulated from the wobble signal and the data signal in the BD. Additionally, regarding the case where the phase shift is introduced due to interference from adjacent tracks, the present invention further provides an improved scheme to correctly demodulate the STW signal read from the BD. It should be noted that the demodulation scheme mentioned in this disclosure is not limited to be applied to the STW signal read from a BD. After reading the above disclosure, a skilled person can readily appreciate that the proposed demodulation scheme can be applied to any input signal modulated from a reference signal and a data signal. This still obeys the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for demodulating an input signal modulated from a reference signal and a data signal, the apparatus comprising:
    a determining unit arranged to determine a plurality of first calculating timings of different calculating modes according to the input signal;
    a first calculating unit arranged to generate a first calculating result of the input signal according to the first calculating timings and the calculating modes thereof; and
    a comparing unit arranged to generate a comparing result according to the first calculating result of the input signal and a threshold setting, and output a demodulated data of the input signal according to the comparing result.

2. The apparatus of claim 1, further comprising:
    a phase locked loop unit arranged to perform a clock recovering operation according to the input signal and generate a reference clock locked to the reference signal;
    wherein the determining unit determines the first calculating timings according to the reference clock.

3. The apparatus of claim 1, wherein the reference signal is a wobble signal.

4. The apparatus of claim 3, wherein a frequency of the data signal is twice as great as a frequency of the wobble signal.

5. The apparatus of claim 1, wherein the first calculating unit is an integrator.

6. The apparatus of claim 5, wherein the first calculating timings are integrating timings, the calculating modes comprise a positive integrating mode and a negative integrating mode interleaved with each other.

7. The apparatus of claim 1, wherein the first calculating unit is an adder.

8. The apparatus of claim 7, wherein the first calculating timings are adding timings, and the calculating modes comprise a positive adding mode and a negative adding mode interleaved with each other.

9. The apparatus of claim 1, wherein the first calculating unit is a sample-and-hold circuit.

10. The apparatus of claim 9, wherein the first calculating timings are sampling timings, and the calculating modes comprise a positive sampling mode and a negative sampling mode interleaved with each other.

11. The apparatus of claim 1, wherein the input signal complies with a Blu-ray disc specification.

12. The apparatus of claim 1, wherein the determining unit further determines a plurality of second calculating timings of changing different calculating modes according to the input signal; the apparatus further comprises: a second calculating unit, coupled to the determining unit and the comparing unit, for generating a second calculating result of the input signal according to the second calculating timings and the calculating modes thereof; and the comparing unit determines the demodulated data according to the first calculating result, the second calculating result, and the threshold setting.

13. The apparatus of claim 12, wherein the first calculating unit further generates a first reference calculating result of a reference section included in the input signal according to the first calculating timings; the second calculating unit further generates a second reference calculating result of the reference section according to the second calculating timings; and the threshold setting is defined according to the first reference calculating result and the second reference calculating result.

14. The apparatus of claim 12, wherein a phase difference between the first calculating timings and the second calculating timings is 90 degrees.

15. The apparatus of claim 12, wherein the input signal complies with a Blu-ray disc specification.

16. A method for demodulating an input signal modulated from a reference signal and a data signal, the method comprising:
    determining a plurality of first calculating timings of changing different calculating modes according to the input signal;
    generating a first calculating result of the input signal according to the first calculating timings and the calculating modes thereof;
    generating a comparing result according to the first calculating result of the input signal and a threshold setting; and
    outputting a demodulated data of the input signal according to the comparing result.

17. The method of claim 16, further comprising:
    performing a clock recovering operation according to the input signal; and
    generating a reference clock locked to the reference signal;
    wherein the first calculating timings are determined according to the reference clock.

18. The method of claim 16, wherein the reference signal is a wobble signal.

19. The method of claim 18, wherein a frequency of the data signal is twice as great as a frequency of the wobble signal.

20. The method of claim 16, wherein the first calculating result is an integrating result.

21. The method of claim 20, wherein the first calculating timings are integrating timings, the calculating modes comprise a positive integrating mode and a negative integrating mode interleaved with each other.

22. The method of claim 16, wherein the calculating result is an adding result.

23. The method of claim 22, wherein the calculating timings are adding timings, and the calculating modes comprises a positive adding mode and a negative adding mode interleaved with each other.

24. The method of claim 16, wherein the calculating result is a sampling result.

25. The method of claim 24, wherein the calculating timings are sampling timings, and the calculating modes comprise a positive sampling mode and a negative sampling mode interleaved with each other.

26. The method of claim 16, wherein the input signal complies with a Blu-ray disc specification.

27. The method of claim 16, wherein the method further comprises:

determining a plurality of second calculating timings of changing different calculating modes according to the input signal;

generating a second calculating result of the input signal according to the second calculating timings and the calculating modes thereof; and determining the demodulated data according to the first calculating result, the second calculating result, and the threshold setting.

28. The method of claim 27, wherein the first calculating unit further generates a first reference calculating result of a reference section transmitted via the input signal according to the first calculating timings; the second calculating unit further generates a second reference calculating result of the reference section according to the second calculating timings; and the threshold setting is defined according to the first reference calculating result and the second reference calculating result.

29. The method of claim 27, wherein a phase difference between the first calculating timings and the second calculating timings is 90 degrees.

30. The method of claim 27, wherein the input signal complies with a Blu-ray disc specification.

* * * * *